US009713977B1

(12) United States Patent
Neal

(10) Patent No.: US 9,713,977 B1
(45) Date of Patent: Jul. 25, 2017

(54) CARGO HANDLING DEVICE FOR A VEHICLE

(71) Applicant: Bryant D. Neal, Tampa, FL (US)

(72) Inventor: Bryant D. Neal, Tampa, FL (US)

( * ) Notice: Subject to any disclaimer, the term of this patent is extended or adjusted under 35 U.S.C. 154(b) by 0 days.

(21) Appl. No.: 15/262,328

(22) Filed: Sep. 12, 2016

Related U.S. Application Data

(60) Provisional application No. 62/217,134, filed on Sep. 11, 2015.

(51) Int. Cl.
*B60P 1/44* (2006.01)
*B62D 33/04* (2006.01)

(52) U.S. Cl.
CPC ........... *B60P 1/4442* (2013.01); *B60P 1/4492* (2013.01); *B62D 33/04* (2013.01)

(58) Field of Classification Search
CPC ..... B60P 1/4442; B60P 1/4414; B60P 1/4421; A61G 3/062
USPC .................. 224/310; 414/545, 556, 540, 541
See application file for complete search history.

(56) References Cited

U.S. PATENT DOCUMENTS

| | | | |
|---|---|---|---|
| 2,498,161 A | 2/1950 | Hamilton | |
| 2,982,431 A | 5/1961 | Moody | |
| 3,113,819 A | 12/1963 | Bessette | |
| 3,174,634 A | 3/1965 | Peck | |
| 3,826,529 A | 7/1974 | Wood | |
| 4,285,557 A | 8/1981 | Paladino | |
| 4,479,753 A | 10/1984 | Thorley | |
| 4,889,377 A | 12/1989 | Hughes | |
| 5,029,935 A | 7/1991 | Dufrancatel | |
| 5,201,575 A | 4/1993 | Stolzel | |
| 5,269,642 A | 12/1993 | Zoromski | |
| 5,641,262 A | 6/1997 | Dunlop | |
| 5,651,657 A * | 7/1997 | Poindexter | B60P 1/4442 187/222 |
| 5,827,037 A | 10/1998 | Wilson | |
| 6,019,567 A * | 2/2000 | Lutkus | B60P 1/003 414/501 |
| 6,077,024 A | 6/2000 | Trueblood | |
| 6,102,648 A | 8/2000 | Fretwell | |
| 6,206,627 B1 | 3/2001 | Winter | |
| 6,234,741 B1 | 5/2001 | McDaniel | |
| 6,558,106 B2 | 5/2003 | Sardonico | |
| 6,666,643 B1 | 12/2003 | Heynssens | |
| 6,811,068 B2 | 11/2004 | Johnson | |
| 7,111,884 B2 | 9/2006 | Johnson | |

(Continued)

*Primary Examiner* — Corey Skurdal
(74) *Attorney, Agent, or Firm* — Frijouf, Rust & Pyle, P.A.

(57) ABSTRACT

A cargo handling device is disclosed for a vehicle. The cargo handling device comprises a base and a lower track. A traveler and a storage unit slidably engage the lower track between a proximal end and a distal end. A linear actuator displaces the traveler between the proximal end and the distal end. A telescoping actuator is pivotably coupled to the traveler and the storage unit. A contracted length in the telescoping actuator maintains the traveler abutting the storage unit during displacement of the traveler between the proximal end and the distal end. An extended length in the telescoping actuator displaces the storage unit from the traveler upon the traveler positioned at the distal end. The extended length defines a horizontal displacement and a vertical displacement of the storage unit from the traveler for positioning the storage unit adjacent the surface.

20 Claims, 19 Drawing Sheets

(56) References Cited

U.S. PATENT DOCUMENTS

| | | | |
|---|---|---|---|
| 7,232,285 B1* | 6/2007 | Ruch | B60P 1/4421 |
| | | | 254/10 R |
| 8,393,665 B2 | 3/2013 | Villano | |
| 8,403,615 B1 | 3/2013 | McGlinn | |
| 8,534,981 B1* | 9/2013 | Bortz | B60P 1/4442 |
| | | | 414/462 |
| 9,381,867 B2* | 7/2016 | Robinson | B60R 9/06 |
| 2001/0026756 A1 | 10/2001 | Mortimore | |
| 2001/0033085 A1 | 10/2001 | Bienert | |
| 2004/0228713 A1 | 11/2004 | Cohn | |
| 2005/0105994 A1* | 5/2005 | Wolfe | B60P 1/4442 |
| | | | 414/540 |
| 2007/0166140 A1* | 7/2007 | Warthan | B60P 1/4407 |
| | | | 414/498 |
| 2007/0269301 A1* | 11/2007 | Eekhoff | B60P 1/4428 |
| | | | 414/543 |
| 2014/0219753 A1* | 8/2014 | Alasfour | B60P 1/4457 |
| | | | 414/501 |
| 2016/0031354 A1* | 2/2016 | Miles | B60P 1/4414 |
| | | | 211/1.51 |
| 2016/0159264 A1* | 6/2016 | Ochenkowski | B60P 1/4442 |
| | | | 414/544 |

\* cited by examiner

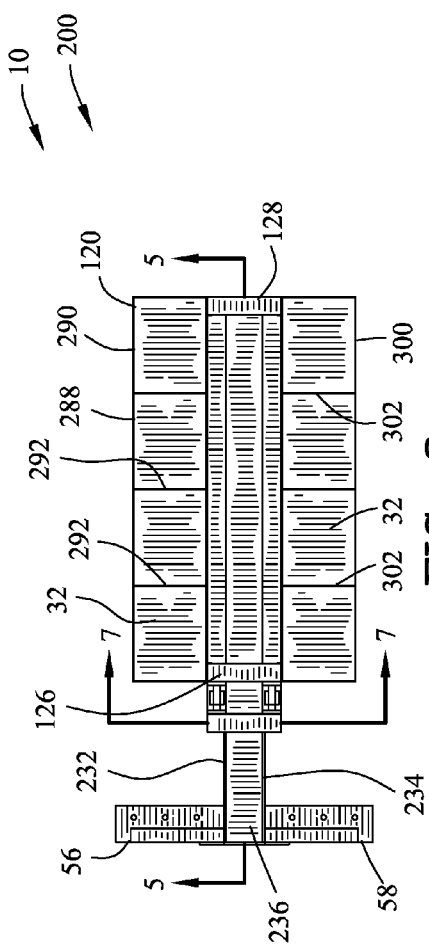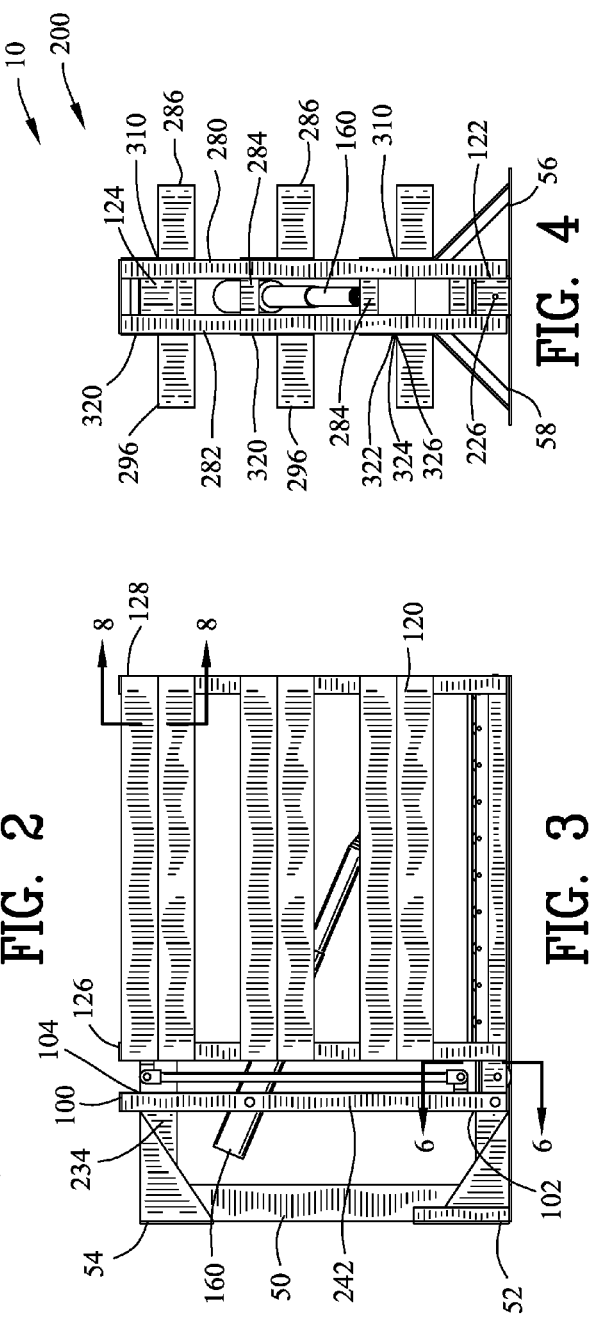

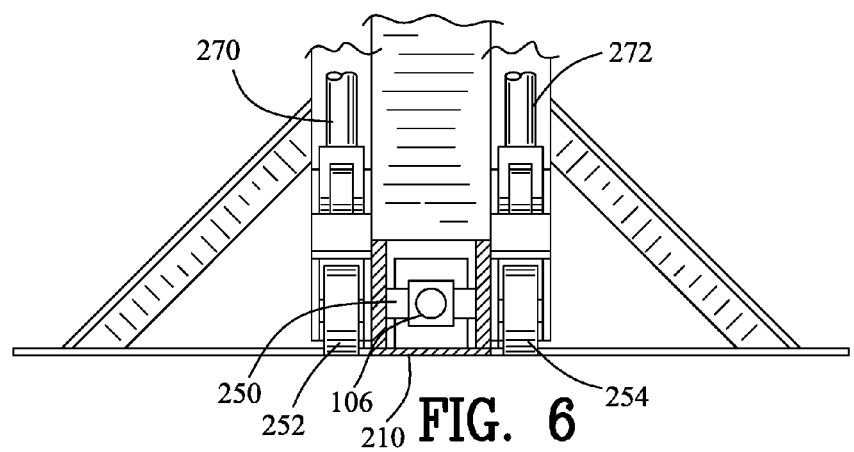
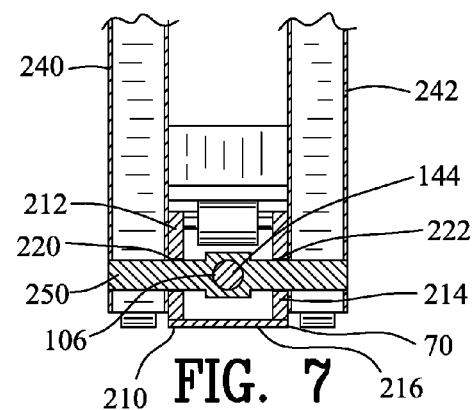
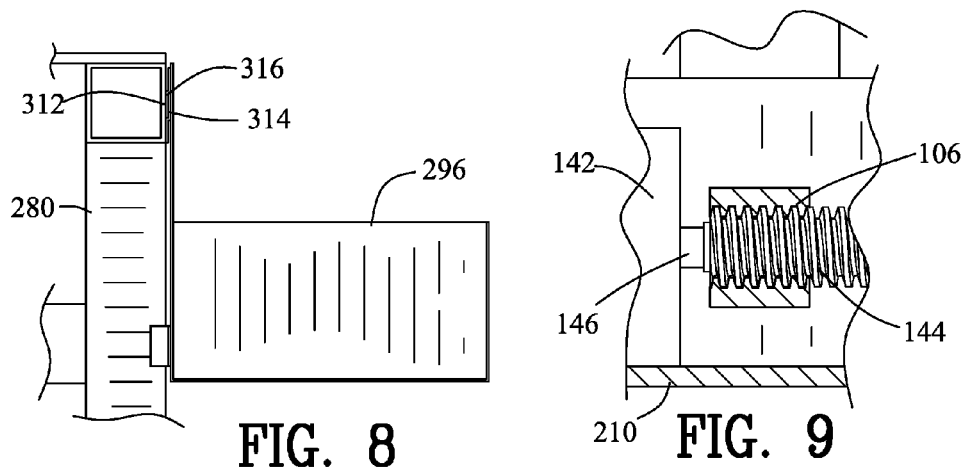

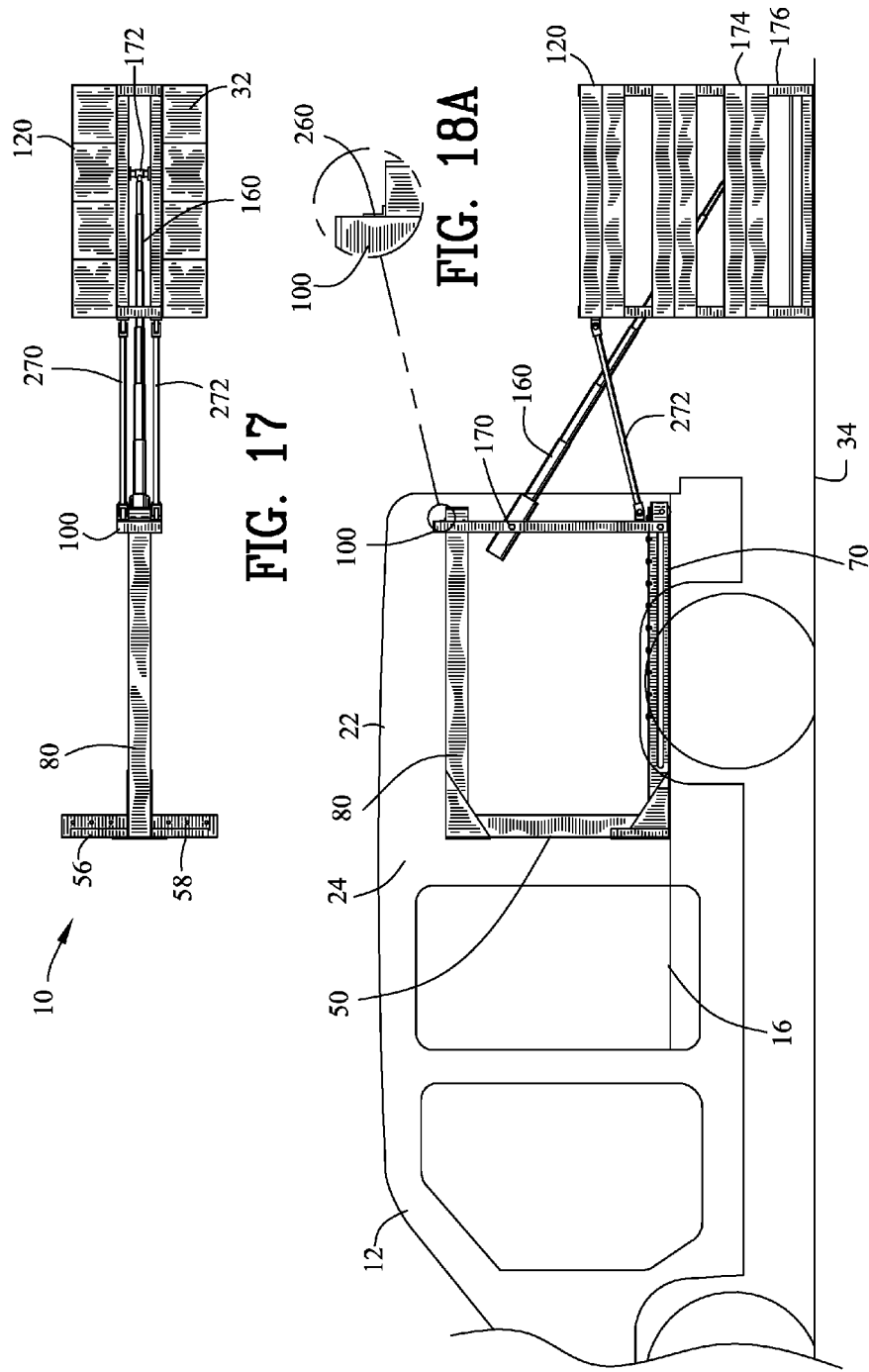

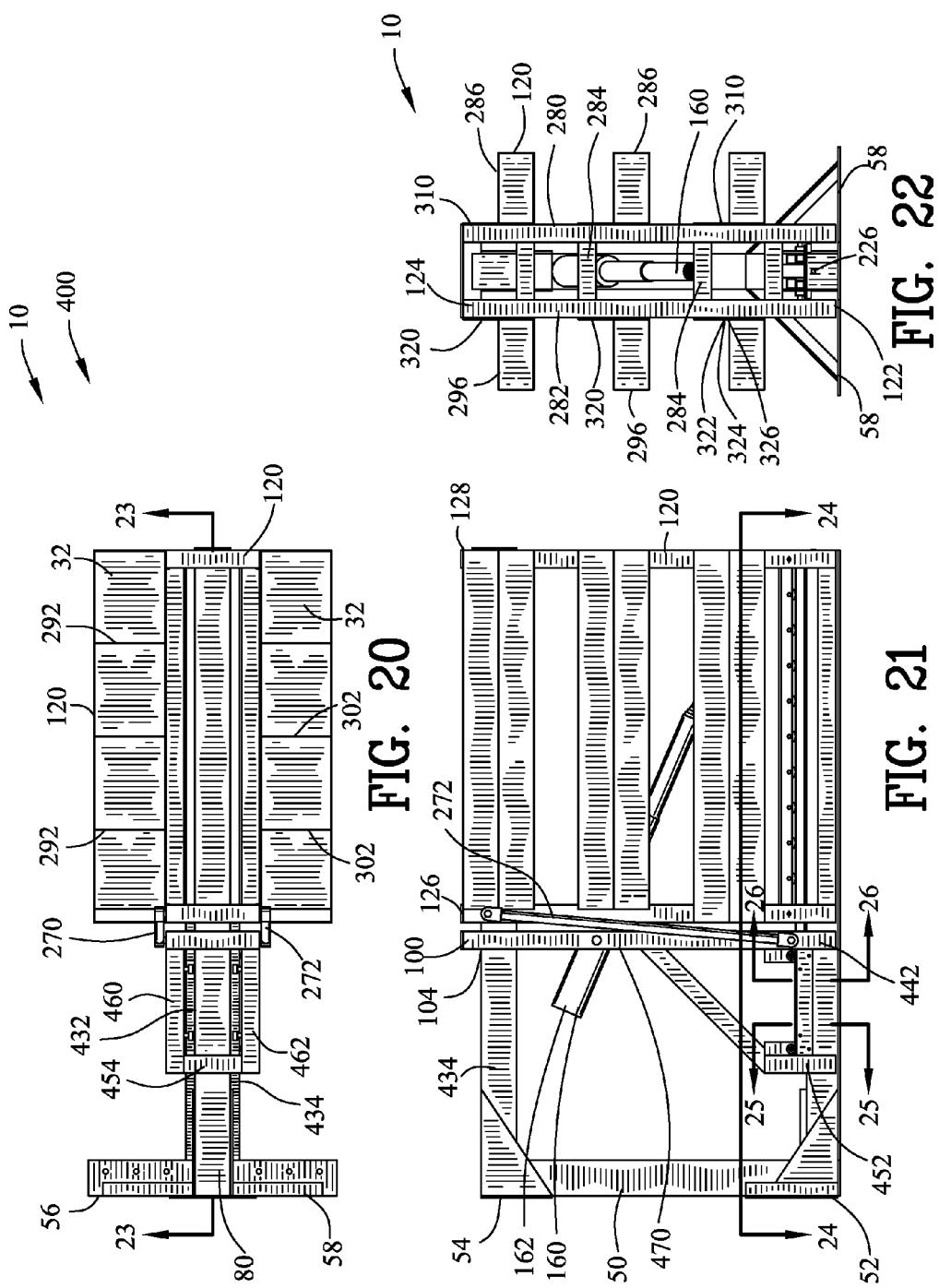

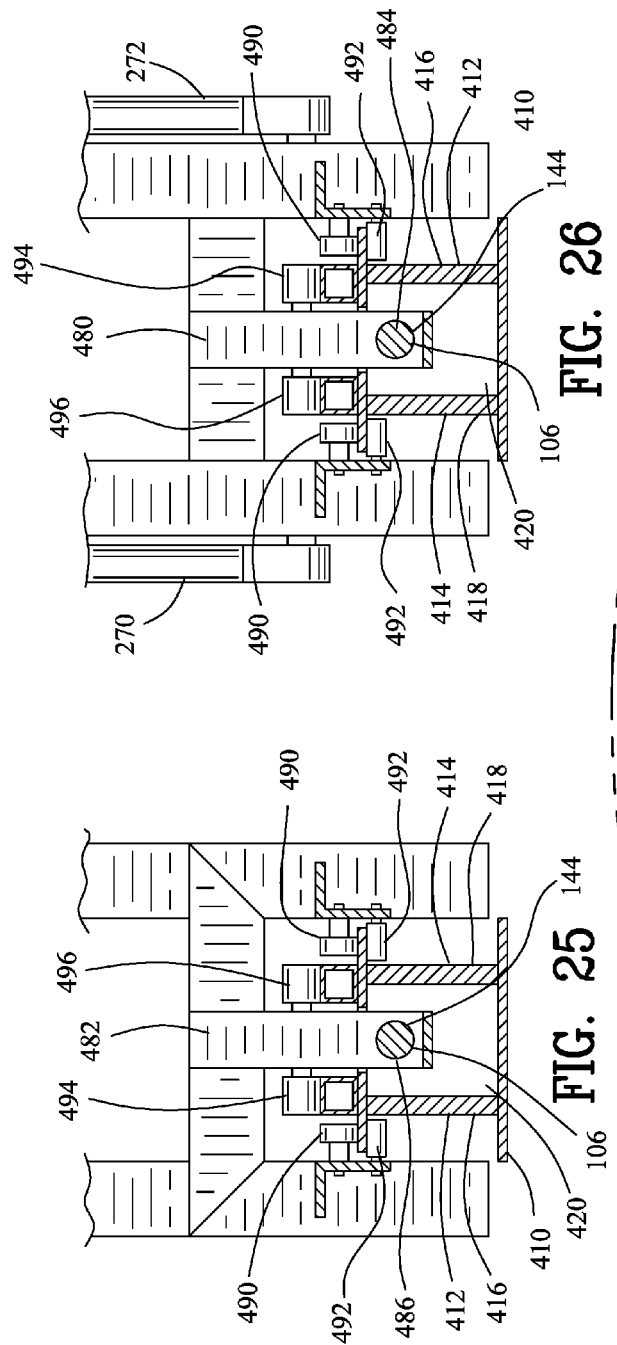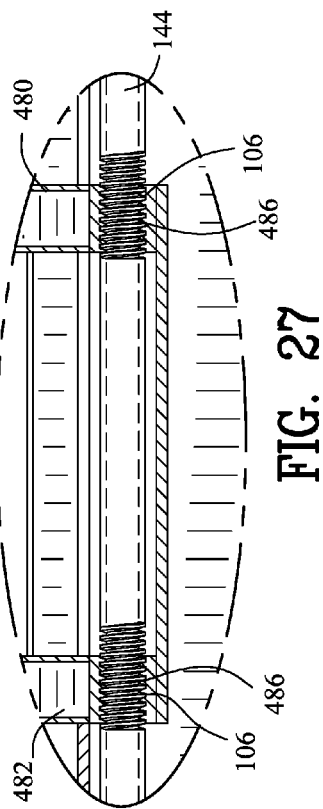

CARGO HANDLING DEVICE FOR A VEHICLE

CROSS-REFERENCE TO RELATED APPLICATIONS

This application claims benefit of U.S. Patent Provisional application Ser. No. 62/217,134 filed Sep. 11, 2015. All subject matter set forth in provisional application Ser. No. 62/217,134 is hereby incorporated by reference into the present application as if fully set forth herein.

BACKGROUND OF THE INVENTION

Field of the Invention

This invention relates to cargo handling and more particularly to a cargo handling device for a vehicle.

Background of the Invention

Part and equipment storage in vans and small trucks has produced a large number and variety of vehicle mounted racks. These racks have provided a great convenience to the user by keeping parts and equipment organized and readily accessible. The necessity to repeatedly enter and exit the vehicle led to the development of racks and shelving units that were removable from within the vehicle, for use at ground level. These racks generally contained relatively small drawers or compartments to store small parts and or tools. The need for a system to store larger tools, equipment and parts and be able to be accessed external to the vehicle and at ground level has remained unanswered.

There have been many in the prior art who have attempted to solve these problems with varying degrees of success. None, however completely satisfies the requirements for a complete solution to the aforestated problem. The following U.S. patents are attempts of the prior art to solve this problem.

U.S. Pat. No. 2,498,161 Hamilton to discloses a closed vehicle body having a doorway opening and a door for closing the opening hinged to the body for swinging movement about a substantially vertical axis. A lift means carried by the inner face of the door including a load supporting member are provided and a means carried by the door for lowering the member with relation to the door and doorway and for raising the member to a position substantially in line with the bottom of the door and doorway is described.

U.S. Pat. No. 2,982,431 to Moody discloses an automobile camper's kit including an attachment support means for securement to the rear end of the automobile chassis. A cross shaft carried by the support means and a means for rotating the shaft is described. A pair of spaced arms carried by the shaft at opposite ends thereof is disclosed. A hanger is suspended from the arms at the ends remote from the shaft, and a kit body is carried by the hanger. A canopy is positioned over the kit body and separable therefrom, with a pair of legs pivotally mounted at one end of the canopy, and having free ends adapted to supportingly engage the support means.

U.S. Pat. No. 3,113,819 to Bessette discloses a car top carrier comprising in combination; a casing having an open side and a pair of opposite end walls with inner surfaces in generally vertical planes and a top wall. A track is slidably mounted on each end wall for movement generally parallel with the inner surface thereof from within the casing through the open side thereof, with a drawer of a size to be contained within the casing. Sockets are provided on the drawer to receive the ends of the track and support the drawer on the tracks and align the same therewith. A means is disclosed for pivotally and slidably mounting the drawer on the tracks for movement partially beyond the end of the tracks to disconnect the sockets therefrom and fore pivoting when in such position from a generally in line with the tracks to a position at right angles thereto. A wheel is provided at the upper end of the drawer to engage the top wall and roll therealong.

U.S. Pat. No. 3,174,634 to Peck discloses a lifting device comprising a hollow outer member of substantially rectangular section being open at each end thereof and having a first longitudinally extending slot formed through one side thereof. A limit stop means is disposed at each open end of the hollow outer member. A hollow intermediate member is disclosed with substantially rectangular section within and approximately the same length as the outer member and having a second longitudinally extending slot formed through one side thereof. The slots in the hollow outer member and the intermediate member register with one another. An inner member is disclosed within the intermediate member and having a part projecting through the registering slots. Projections are run along substantially the entire length of the longitudinally extending outer edges of the intermediate member to provide bearing members therefore. The bearing members bear against machined inner bearing surfaces formed on the outer member, projections running longitudinally along substantially the entire length of the longitudinally extending outer edges of the inner member to provide bearing members therefore. The last mentioned bearing members bear against machined inner bearing surfaces on the intermediate member and one of the other two members so as to selectively move the intermediate member either above or below the one member. A guide means is mounted on the upper end of the intermediate member and a flexible member is looped over the guide means. The flexible member has the opposite ends thereof secured to the outer and inner members respectively in such a manner that the other of the two other members may be moved by the flexible member either above or below the intermediate member when the intermediate member is moved above or blow the one member.

U.S. Pat. No. 3,826,529 to Wood discloses an automotive vehicle body, such as a pickup truck, with a rack for tools or the like. The rack is in the form of a cabinet and supported on a track. The rack can be pulled completely from the vehicle to provide access to the contents of the rack.

U.S. Pat. No. 4,285,557 to Paladino, et al. discloses a storage tray assembly for packaged articles where the tray has a plurality of parallel spaced upstanding panels adapted to engage a packaged article. The tray may be fixed on an angled bracket means or be slidably mounted in the bottom of a housing. The tray also may be pivotally mounted in the bottom of a housing and connected by levers to the housing such that when the front of the housing is opened, the tray is raised to a substantially tilted position and moved forward in the housing. Clamping means may be associated with each panel so as to resiliently engage a packaged article to prevent its rattling in the tray.

U.S. Pat. No. 4,479,953 to Thorley discloses a lift characterized by its ability to be simply retrofitted into a van or similar vehicle of virtually any style construction without requiring the modification of the existing structure. The unit comes in a small, neat package which is hinged on a vertical axis to a door post adjacent the hinge of one of the doors. The mounting plate of the unit which mounts the hinge also mounts a slide in its distal end which slides in a track in the door, so that as the door is opened the mounting plate is supported at one end by its hinge and at the other end in the slide. A horizontal carrier slides outwardly on tracks on the mounting plate, so that the unit clears the vehicle structure, and then a vertical carrier descends from the horizontal carrier by virtue of a hydraulic actuator. A folding platform then swings down on its horizontal hinge along the lower edge of the vertical carrier, and the various extensions and safety flaps necessary for proper operation are then deployed from within the platform structure. In its deployed mode, the platform is vertically moved on the vertical carrier, and is subsequently stowed by drawing the collateral structure into the platform, swinging the platform from its horizontal position up vertically against the horizontal and vertical carriers, with the carrier being telescoped so that all three units define a small package which can slide inwardly on the mounting plate permitting the door to close, so that the entire lift package, when not deployed, is neatly stowed in a relatively small space in the interior of the van.

U.S. Pat. No. 4,889,377 to Hughes discloses a vehicle storage system apparatus attached to a vehicle and adapted to slide out on a suspension frame to make storage bins and the like more accessible from the vehicle. A vehicle body, such as a panel truck or van, has a vertically suspended framework attached to the vehicle body. The frame has at least two horizontal channels supported thereon and a sliding carriage which is slidably mounted in the channels and supported by the channels and which can be slide from a first position in the vehicle to a second position extending from the vehicle. The sliding carriage has a panel attached thereto with a plurality of storage members attachable to the panel. The panel has attaching openings therein for attaching storage bins. The locking conventional allows the sliding storage carriage to be locked in place in the vehicle and to be released from outside the vehicle for sliding the carriage to a position extending from the vehicle.

U.S. Pat. No. 5,029,935 to Dufrancatel discloses an arrangement for shifting a piece of furniture through an opening in a vertical partition, such as a wall of a vehicle. The invention includes a linkage system which maintains the orientation of the piece of furniture as it is moved between two extreme positions, wherein one of the positions is offset to be lower than the other position. When incorporated in a vehicle, the lateral offset between the two extreme positions is approximately equal to the height of the floor of the vehicle above a ground surface so that if the piece of furniture is a kitchen unit, such as a stove, its working surfaces will be at the same height for use inside the vehicle as when used in the outer position outside the vehicle.

U.S. Pat. No. 5,201,575 to Stolzel discloses a container for storing cylindrical articles in a readily accessible manner, comprising an open ended channel shaped cabinet body having a bottom and two side walls and rails upstanding from the cabinet body bottom and extending longitudinally thereof. A drawer is slidable in the cabinet body on the rails and having a front end, a back wall, a bottom, and side walls upstanding from the bottom; and cooperating pivoting structure located near the front of the cabinet body and the rear of the drawer to permit a hinging-like rotation of the drawer on the body, whereby to enable the drawer to hang downwardly from the front end of the body for article handling. The cooperating pivoting structure comprises an upstanding, inwardly directed flange member at the front edge of each cabinet body side wall, and a ledge member extending beneath the drawer bottom and outwardly of each of the drawer side walls. The flanges and ledges cooperate to permit the hinging-like rotation, to enable the drawer to hang substantially vertically downwardly.

U.S. Pat. No. 5,269,642 to Zoromski discloses a container loading and unloading system including a first set of cables attached to the front of the container, a second set of cables attached to the rear of the container, and a winch for alternately extending and retracting the cables by rotating a cross bar. A pair of substantially parallel rails is provided for supporting the bottom of the container, with a pivot bar located between and normal to both rails, and a yoke for supporting the pivot bar. To load the container—which may be a camper, a cargo box or a tool box—a cross bar is rotated in a first direction to extend the first set of cables and to retract the second set of cables, thereby pulling the container along the rail members onto a raised surface. The rails pivot along with the container on the pivot bar to assist in the loading operation. To unload the container, the cross bar is rotated in the opposite direction to retract the first set of cables and to extend the second set of cables, with the rails again pivoting about the pivot bar to lower the container onto the ground.

U.S. Pat. No. 5,641,262 to Dunlop, et al. discloses a hydraulic lift apparatus in general and to a hydraulically operated vehicular tailgate lift apparatus in particular.

U.S. Pat. No. 5,827,037 to Wilson, Jr. discloses a trailer chassis for receiving and transporting shipping containers having a platform extension fixedly attached to the rear end and with a liftgate that can be moved between a position level with the platform extension and ground level. The platform extension and the liftgate are each large enough for a loaded pallet handler to maneuver. This construction allows a forklift, pallet jack or other pallet handler to unload palletized cargo directly from the shipping container at various retail locations without the need for an elevated loading dock.

U.S. Pat. No. 6,077,024 to Trueblood discloses a modular cargo system for a truck-style vehicle including a cargo box having demountable pivot points on opposite sides near the front and bottom. Translating drives move along opposite sides of the truck bed and carry translating pivot blocks. Each translating pivot block has a pivotally-connected dual-link mechanism also pivotally connectable at the opposite ends to the demountable pivot points on the cargo box. The dual link mechanisms are of a length to allow the cargo box to sit on the ground behind the truck bed with the translating blocks moved near the tail end of the truck bed. By moving the translating blocks toward the cab end of the truck bed, the dual-link mechanisms articulate at an approximate end point, and the lower links are adapted to guide over the tail end of the truck bed while raising the front end of the cargo box in a manner that the front end of the cargo box clears the tail end of the truck bed. Further movement toward the cab end pulls the cargo box up into the truck bed. Mechanisms are provided for folding the link mechanisms so the cargo box may be fully boarded, and for ejecting the cargo box in several different ways.

U.S. Pat. No. 6,102,648 to Fretwell, et al. discloses a vehicle lift for use in conjunction with a vehicle to facilitate passengers boarding and leaving the vehicle. The vehicle lift has an improved driving mechanism for moving a platform between a stowed position to a deployed position. The driving mechanism includes a bidirectional motor which is mechanically coupled to a gear box which in turn is coupled to a pinion that is connected to a main sprocket. A longitudinal bracket is affixed to the underside of a top panel of the mounting enclosure and is located parallel to a longitudinal guide bar. At both ends of the longitudinal bracket are sprockets which are coupled by a loop chain. Accordingly, engaging the main sprocket with the loop chain moves the traveling assembly inward or outward with respect to the vehicle. The chain is immobilized by a manual spring biased locking mechanism to prevent the chain from moving linearly along the bracket. Therefore, when the motor is energized, it actuates the gear box which in turn drives the pinion, which in turn rotates the main sprocket to linearly travel on the chain moving the platform to a deployed position and visa verse.

U.S. Pat. No. 6,206,627 to Winter, et al. discloses a loading device for containers comprising a pair of loading units, each having a telescopic column supported on a bracket so as to be swivelled about a common swivel axis. The telescopic column consists of a lower portion, an upper portion and a column cylinder moving the upper portion with respect to the lower portion. Actuating cylinders are connected to the lower portion on both sides, and the upper portion accommodates an extension arm which can be swivelled about a swivel axis parallel to the swivel axis of the telescopic column. To expand the loading possibilities, the upper portion carries a column head which forms a slot-shaped swivel guide with cam tracks limiting the swivelling of the extension arm. The extension arm has guide members and is pivotally connected with a sliding piece movably seated inside the upper portion which opens towards the swivel guide, where a constriction is provided between the cam tracks, so that the guide members of the extension arm aligned in a position stretched with respect to the telescopic column simultaneously contact both cam tracks, and on the side of the upper portion the column cylinder acts on the sliding piece which can be moved upwards along a path limited by a stop.

U.S. Pat. No. 6,234,741 to McDaniel discloses a hydraulically operated fork lift device adapted to be installed within the bed of a conventional pickup truck, wherein the horizontal movement of the fork is provided by movement of the truck. When the device is not in use, it is disposed above the forward portion of the truck bed.

U.S. Pat. No. 6,558,106 to Sardonico discloses a lifting device for disabled people in wheelchairs and children's pushchairs, comprising a supporting frame, permanently applied to a motor vehicle or a fixed installation, and a sliding foldaway platform moving between a retracted position and an extracted position, with respect to the supporting frame. The platform can also move in the extracted position, between a lowered position and a raised position, by means of an articulated parallelogram linkage system. The movements of the platform are achieved by means of electrical actuators.

U.S. Pat. No. 6,666,643 to Heynssens discloses a frame with a pair of primary tracks positioned on a vehicle. A platform is connected by a plurality of flexible ties to a like plurality of hangers which travel along the primary tracks. An elevator mechanism winds the flexible ties onto reels to rise the platform toward the primary tracks and unwinds the flexible ties to lower the platform. Extension tracks can be removably aligned with the primary tracks to project beyond the vehicle. By moving the hangers onto the extension tracks, the platform can be removed from the vehicle and then lowered to the ground. The reverse process is employed to move the platform and objects thereon from the ground into the vehicle. The extension tracks with the hangers and platform attached thereto can be detached from the primary tracks and placed on a free standing frame to raise and lower the platform remote from the vehicle.

U.S. Pat. No. 6,811,068 to Johnson discloses a storage caddy having a slidable drawer on which items are stored. Items are presented for removal when the drawer is slid from the shell of the caddy. Items stored in a caddy with a hinged drawer, can be removed by breaking the drawer at the hinge to drop the item toward the ground for convenient and safe removal. A set of golf clubs stored in the caddy in the bed of a pick-up truck are slid from the shell on the drawer. The horizontal plane of the drawer is then broken at the hinge and the bottom of the golf bag moves toward the ground. The golf bag can then be easily lifted onto the shoulder or rolled away. The caddy positions heavy items for easy removal preventing undue stress or injury on those retrieving items from the caddy.

U.S. Pat. No. 7,111,884 to Johnson discloses a storage compartment and integrated tailgate work surface. The storage compartment is easily retrofitable to any standard or light duty pick-up truck bed. A parallel linkage mechanism and integrated power unit can raise and lower the storage compartment without rotation, thereby keeping objects in an initial desired orientation and placement within the compartment. The parallel linkage system also facilitates adjustment of the integrated tailgate work surface to convenient working heights.

U.S. Pat. No. 8,393,665 to Villano, et al. discloses a pick-up truck bed toolbox system utilizing a tool storage box which, in its stored, stationary position, rests on the floor of the bed of a pick-up truck such that it is parallel to the side wall of the truck. Electric motors, which can be remotely operated, are utilized to rotate dual, upstanding screw shafts which are connected via laterally extending cantilever arm members to the front and rear ends of the toolbox. The screw shafts raise the toolbox from its resting position on the floor of the bed of the pick-up truck, to an elevated position over the floor, and the shafts then operate to move the arm members laterally to extend the tool box to a position passed the side wall. The screw shafts can then be activated to lower the tool box to a lowered position outside the truck, adjacent to and alongside the sidewall, thus providing easy and ready access to the toolbox. The same system is utilized to return the toolbox from this lowered position outside the truck, to the floor of the truck bed.

U.S. Pat. No. 8,403,615 to McGlinn, et al. discloses a vehicle lift barrier adapted to be mounted to vehicle lifts and the like that assist in loading and unloading cargo and provide a storage environment in which cargo is less likely to migrate from a cargo area into a passenger seating area or compartment. A barrier composed of a barricade is mounted to a vehicle lift, in some cases example by mounting the barrier to a generally vertical post, mast or the like or mounting the barrier to a lift platform, allowing the lift to operate normally while the barricade obstructs all or a substantial portion of the passage between the motor vehicle storage/cargo area and the passenger area. Where the barrier is mounted to a vertical post or the like on a vehicle lift, cut-out bracketing can be used to mate with the outer cross-sectional shape of the post to inhibit pivoting of the barrier about the post. Other bracket profiles can be used to enhance the barrier's protective advantages. A wrap-around sheet metal bracket configuration creates two flanges per bracket to reinforce bracing and to provide securing belt mounting points for a given vehicle lift. Such barriers can be used in motor vehicles with rear and/or side access-ways where vehicle lifts typically are provided and do not require special tie-downs or other cargo securing means, making such devices especially useful in vehicles that might serve a number of different users and/or that might transport a variety of types of cargo and/or mobility devices.

United States Patent Application 2001/0026756 to Mortimore discloses a lift carried in a van or a similar transporting vehicle to load and unload cargo such as a mobility scooter. A base reciprocable on a track carries an extendable and retractable lift arm assembly which includes a pair of parallel linkages. The lift arm assembly carries an elevator platform to accommodate the load. An actuator moves the base lift arm assembly and platform from a stored position in the vehicle to a loading and unloading position adjacent a rear or side door.

United States Patent Application 2001/0033085 to Bienert et al. discloses a loading system for a cargo space of a motor vehicle, such as a passenger vehicle. The loading system includes a pull-out cargo floor, a guide system for longitudinally moving the cargo floor from a rest position into an extended position projecting out of the cargo space. The guide system, in the area of the end that is extended out of the cargo space, can be upwardly pivoted with respect to the cargo space while the opposite end area is vertically fixed with respect to the cargo space.

United States Patent Application 2004/0228713 to Cohn, et al. discloses a lift assembly including an enclosure secured to the bottom floor of the baggage compartment. A carriage is reciprocally mounted within the enclosure. A lift platform is pivotally coupled to the carriage. The lift platform may be equipped with a variety of safety features, such as a ramp barrier, a bridge barrier, a pair of handrails, and combinations thereof for providing protection and a sense of security for a passenger while on the lift platform.

Although the aforementioned prior art have contributed to the development of the art of vehicle shelving systems, none of these prior art patents have solved the needs of this art.

Therefore, it is an object of the present invention to provide an improved vehicle shelving system that provides easy access to the shelving system contents.

Another object of this invention is to provide an improved vehicle shelving system that is easy for the operator to use.

Another object of this invention is to provide an improved vehicle shelving system that is easy to cost effectively produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved cargo handling device for a vehicle. The cargo handling device comprises a base extending between a lower end and an upper end. The lower end of the base is coupled to the cargo surface. A lower track extends between a proximal end and a distal end. The proximal end of the lower track is coupled to the base. An upper track extends between a proximal end and a distal end. The proximal end of the upper track is coupled to the base. A traveler has a lower track receiver and an upper track receiver. The lower track receiver of the traveler slidably engages the lower track between the proximal end and the distal end of the lower track. The upper track receiver of the traveler slidably engages the upper track between the proximal end and the distal end of the upper track. A storage unit has a lower track receiver and an upper track receiver and extends between a proximal end and a distal end. The lower track receiver of the storage unit slidably engages the lower track between the proximal end and the distal end of the lower track. The upper track receiver of the storage unit slidably engages the upper track between the proximal end and the distal end of the upper track. A linear actuator engages the base and the traveler for displacing the traveler along the lower track and the upper track between the proximal end and the distal end of the lower track and the upper track. A telescoping actuator defines a contracted length and an extended length. An upper actuator pivot pivotably couples the telescoping actuator to the traveler. A lower actuator pivot pivotably couples the telescoping actuator to the storage unit. The contracted length in the telescoping actuator maintains the traveler abutting the proximal end of the storage unit during displacement of the traveler between the proximal end and the distal end of the lower track and the upper track. The extended length in the telescoping actuator displaces the storage unit from the traveler upon the traveler positioned at the distal end of the lower track and the upper track. The extended length defines a horizontal displacement and a vertical displacement of the storage unit from the traveler for positioning the storage unit adjacent the surface. A cargo receiver is coupled to the storage unit for engaging the cargo.

In a more specific embodiment of the invention, the linear actuator includes a motor and a threaded rod. The motor is coupled to the base and provides a rotational force. The threaded rod is coupled to the motor for rotating the threaded rod with the rotational force. A threaded aperture is in the traveler for threadably engaging the threaded rod. The rotational force causes the traveler to be linearly displaced between the proximal end and the distal end of the lower track and the upper track.

In one embodiment of the invention, the lower track includes a base wall, a first side wall and a second side wall for defining a general C-shape. The base wall is coupled to the cargo surface. The first side wall includes a first elongated slot. The second side wall includes a second elongated slot. The upper track includes a lower wall, a first side wall, a second side wall and an upper wall. The traveler includes a first frame, a second frame and an upper cross frame. The first frame is positioned adjacent to the first side wall of the lower track and the first side wall of the upper track. The second frame is positioned adjacent to the second side wall of the lower track and the second side wall of the upper track. A traveler pin is secured to the first frame and a second frame and traverses the first elongated slot and the second elongated slot. The threaded aperture is in the traveler pin. The traveler pin slidably engages along the first elongated slot and the second elongated slot during displacement of the traveler between the proximal end and the distal end of the lower track and the upper track.

In another embodiment of the invention, the lower track includes a base wall, a first general T-shape and a second general T-shape. The first general T-shape is coupled to the base wall for defining a first I-beam. The second general T-shape is coupled to the base wall for defining a second I-beam. The first I-beam and the second I-beam define a beam channel there between. The base wall is coupled to the cargo surface. The upper track includes a lower wall, a first side wall, a second side wall and an upper wall. The traveler includes a first rear frame, a second rear frame, an upper rear cross frame and a lower rear cross frame. The traveler includes a first front frame, a second front frame and a lower front cross frame. A primary frame bar couples the first rear frame with the first front frame. A secondary frame bar couples the second rear frame with the second front frame. The first rear frame is positioned adjacent to the first I-beam of the lower track and the first side wall of the upper track. The first front frame is positioned adjacent to the first I-beam of the lower track. The second rear frame is positioned adjacent to the second I-beam of the lower track and the second side wall of the upper track. The second front frame is positioned adjacent to the second I-beam of the lower track. A rear traveler arm is secured to the lower rear cross frame and extends into the beam channel. A front traveler arm is secured to the lower front cross frame and extends into the beam channel. The threaded aperture defines a rear threaded aperture in the rear traveler arm and a front threaded aperture in the front traveler arm.

The invention is also incorporated into the method of activating a linear actuator engaging a base and a traveler. The traveler is displaced from a proximal end and to a distal end of a lower track and an upper track by the linear actuator. A storage unit is displaced from the proximal end and to a cantilever position above the surface and beyond the distal end of a lower track and an upper track by coupling with the traveler. The linear actuator is deactivated upon the traveler positioned at the distal end of the lower track and the upper track. A telescoping actuator is activated that engages the traveler and the storage unit. The storage unit is displaced from the traveler including a horizontal displacement and a vertical displacement by the telescoping actuator. The telescoping actuator is deactivated upon positioning the storage unit adjacent the surface.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 2 is a top view of FIG. 1;
FIG. 3 is a right side view of FIG. 1;
FIG. 4 is a rear view of FIG. 1;
FIG. 6 is a sectional view along line 6-6 in FIG. 3;
FIG. 7 is a sectional view along line 7-7 in FIG. 2;
FIG. 8 is a sectional view along line 8-8 in FIG. 3;
FIG. 9 is an enlarged portion of FIG. 5 illustrating a threaded aperture in a traveler for threadably engaging a threaded rod;
FIG. 17 is a top view of the cargo handling device of FIG. 16;
FIG. 18 is a right side view of FIG. 16;
FIG. 18A is an enlarged portion of FIG. 18 illustrating a stop plate coupled to an upper track and engaging the traveler for preventing disengagement of the traveler from the upper track;
FIG. 20 is a top view of FIG. 19;
FIG. 21 is a right side view of FIG. 19;
FIG. 22 is a rear view of FIG. 19;
FIG. 25 is a sectional view along line 25-25 in FIG. 21;
FIG. 26 is a sectional view along line 26-26 in FIG. 21;
FIG. 27 is an enlarged portion of FIG. 23 illustrating a rear threaded aperture and a front threaded aperture in a traveler for threadably engaging a threaded rod.

Similar reference characters refer to similar parts throughout the several Figures of the drawings.

DETAILED DISCUSSION

Figure 1:
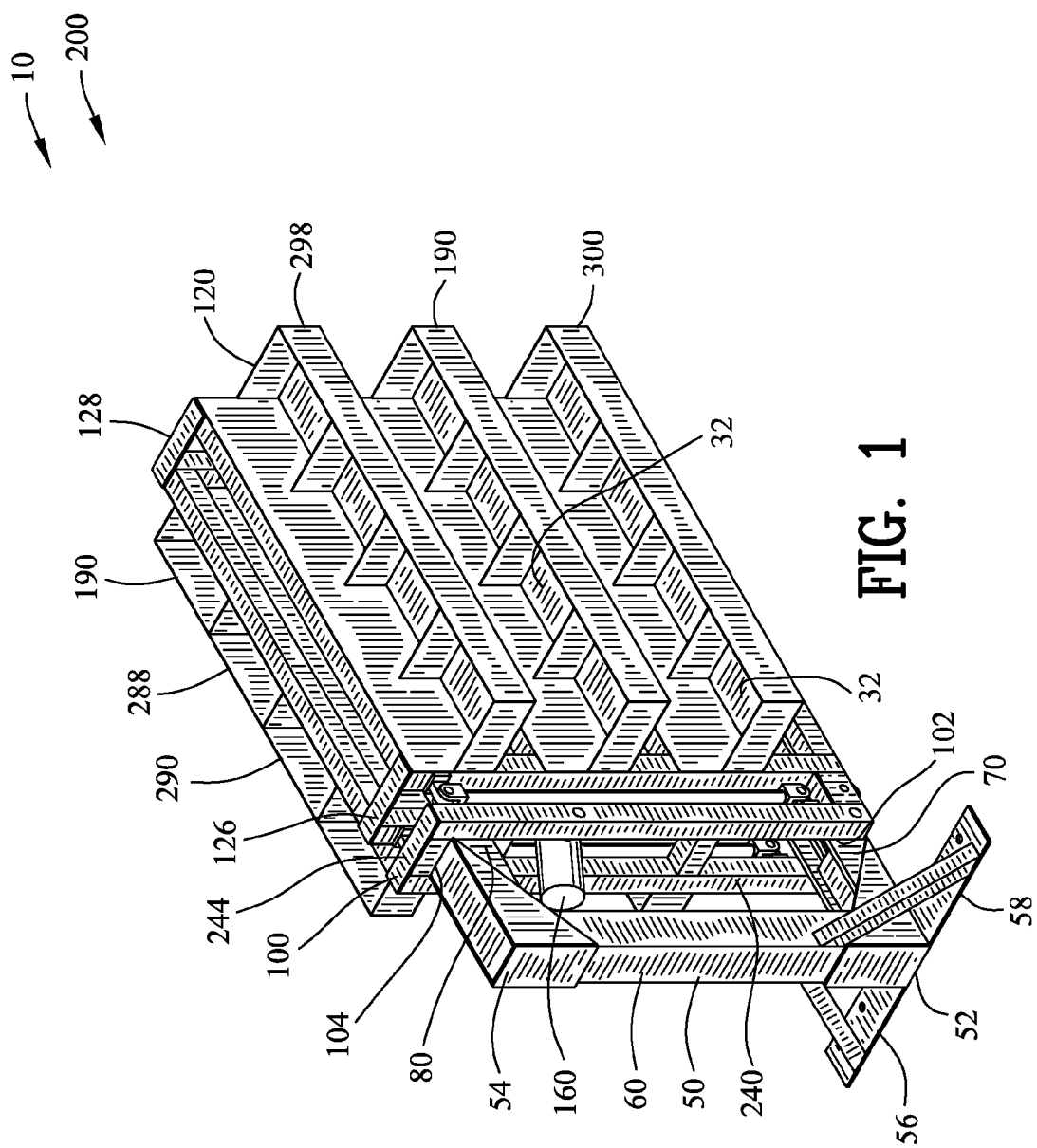
FIG. 1 is an isometric view of a first embodiment of a cargo handling device.

FIGS. 1-31 illustrate a cargo handling device 10 utilized with a vehicle 12. The vehicle 12 is shown as a van 14, however the vehicle 12 may include but not limited to a truck, trailer, mini-van, all terrain vehicle, automobile or other vehicles. The vehicle 12 has a cargo surface 16, a first cargo wall 18, a second cargo wall 20 and a cargo ceiling 22. The cargo surface 16, the cargo first wall 18, the second cargo wall 20 and the cargo ceiling 22 define a cargo area 24. The vehicle 12 includes a rear cargo aperture 26 for accessing the cargo area 24. The rear cargo aperture 26 may include a first door 28 and a second door 30 for closing the rear cargo aperture 24. The vehicle 12 transports a cargo 32 over a surface.

The cargo handling device 10 comprises a base 50 extending between a lower end 52 and an upper end 54. The lower end 52 of the base 50 is coupled to the cargo surface 16. The base 50 may further include a primary base plate 56 and a secondary base plate 58 coupled to the base 50. The primary base plate 56, the secondary base plate 58 and the base 50 define an inverted T-shape 60. The inverted T-shape 60 is coupled to the cargo surface 16 by bolts, screws, rivets, adhesives or other fasteners means.

A lower track 70 extends between a proximal end 72 and a distal end 74. The proximal end 72 of the lower track 70 is coupled to the base 50 and preferably is coupled to the cargo surface 16 by bolts, screws, rivets, adhesives or other fasteners means. An upper track 80 extends between a proximal end 82 and a distal end 84. The proximal end 82 of the upper track 80 is coupled to the base 50. The lower track 70 and the upper track 80 may be coupled to the base 50 by welding, bolting or other fastening means.

A traveler 100 has a lower track receiver 102 and an upper track receiver 104. The lower track receiver 102 of the traveler 100 slidably engages the lower track 70 between the proximal end 72 and the distal end 74 of the lower track 70. The upper track receiver 104 of the traveler 100 slidably engages the upper track 80 between the proximal end 82 and the distal end 84 of the upper track 80. The inverted T-shape 60 prevents lateral displacement of the lower track 70, the upper track 80 and the base 50.

A storage unit 120 has a lower track receiver 122 and an upper track receiver 124 and extends between a proximal end 126 and a distal end 128. The lower track receiver 122 of the storage unit 120 slidably engages the lower track 70 between the proximal end 72 and the distal end 74 of the lower track 70. The upper track receiver 124 of the storage unit 120 slidably engages the upper track 80 between the proximal end 82 and the distal end 84 of the upper track 80.

A linear actuator 140 engages the base 50 and the traveler 100 for displacing the traveler 100 along the lower track 70 and the upper track 80 between the proximal end 72, 82 and the distal end 74, 84 of the lower track 70 and the upper track 80. The linear actuator 140 may include a motor 142 and a threaded rod 144. The motor 142 is coupled to the base 50 and provides a rotational force 146. The threaded rod 144 is coupled to the motor 142 for rotating the threaded rod 144 with the rotational force 146. A threaded aperture 106 is in the traveler 100 for threadably engaging the threaded rod 144. The rotational force 146 causes the traveler 100 to be linearly displaced between the proximal end 72, 82 and the distal end 74, 84 of the lower track 70 and the upper track 80. The linear actuator 140 may include an electric garage door opener. Alternatively, the linear actuator 140 may include an electric motor with a drive shaft coupled to the threaded rod 144 wherein the electric motor terminates rotation upon the traveler 100 positioned at the proximal end 72, 82 and the distal end 74, 84.

A telescoping actuator 160 defines a contracted length 162 as shown in FIGS. 1-15 and FIGS. 19-29 and an extended length 164 as shown in FIGS. 16-18 and FIG. 30. The telescoping actuator 160 may include an electric telescoping actuator, hydraulic telescoping actuator or other expanding and contracting devices. An upper actuator pivot 170 pivotably couples the telescoping actuator 160 to the traveler 100. A lower actuator pivot 172 pivotably couples the telescoping actuator 160 to the storage unit 120.

The contracted length 162 in the telescoping actuator 160 maintains the traveler 100 abutting the proximal end 126 of the storage unit 120 during displacement of the traveler 100 between the proximal end 72, 82 and the distal end 74, 84 of the lower track 70 and the upper track 80. The extended length 164 in the telescoping actuator 160 displaces the storage unit 120 from the traveler 100 upon the traveler 100 positioned at the distal end 74, 84 of the lower track 70 and the upper track 80. The extended length 164 defines a horizontal displacement 174 and a vertical displacement 176 of the storage unit 120 from the traveler 100 for positioning the storage unit 120 adjacent the surface 34. A cargo receiver 190 is coupled to the storage unit 120 for engaging the cargo 32. By positioning the storage unit 120 adjacent to the surface 34 permits an individual to more easily access cargo without have to enter the vehicle. The overall width of the cargo handling device 10 may be narrow for allowing the storage unit 120 to be positioned between a first fixed shelving 40 and a second fixed shelving 42 secured to the first cargo wall 18 and the second cargo wall 20 respectively.

FIGS. 1-18, illustrate a first embodiment 200 of the subject invention. The lower track 70 includes a base wall 210, a first side wall 212 and a second side wall 214 for defining a general C-shape 216. The base wall 210 is coupled to the cargo surface 16. The first side wall 212 includes a first elongated slot 220. The second side wall 214 includes a second elongated slot 222. The distal end 74 of the lower track 70 may include a distal plate 224 having a threaded rod aperture 226 for receiving the threaded rod 144. The motor 142 may be positioned within the general C-shape 216 adjacent to the proximal end 72 for extending the threaded rod 144 through the general C-shape 216 to the threaded rod aperture 226. The upper track 80 includes a lower wall 230, a first side wall 232, a second side wall 234 and an upper wall 236.

The traveler 100 includes a first frame 240, a second frame 242, an upper cross frame 244 and a lower cross frame 246. The upper cross frame 244 is positioned above the upper track 80. The lower cross frame 246 is positioned below the upper track 80. The first frame 240, second frame 242, upper cross frame 244 and lower cross frame 246 define an upper track aperture 248. The upper track 80 is positioned within the upper track aperture 248. The first frame 240 is positioned adjacent to the first side wall 212 of the lower track 70 and the first side wall 232 of the upper track 80. The second frame 242 is positioned adjacent to the second side wall 214 of the lower track 70 and the second side wall 234 of the upper track 80.

A traveler pin 250 is secured to the first frame 240 and a second frame 242 and traverses the first elongated slot 220 and the second elongated slot 222. As best shown in FIGS. 6 and 7, the threaded aperture 106 is in the traveler pin 250. The traveler pin 250 slidably engages along the first elongated slot 220 and the second elongated slot 222 during displacement of the traveler 100 between the proximal end 72, 82 and the distal end 74, 84 of the lower track 70 and the upper track 80.

A first traveler wheel 252 is coupled to the first frame 240. A second traveler wheel 254 may be coupled to the second frame 242. The first traveler wheel 252 and the second traveler wheel 254 contacting the cargo surface 16 for supporting and rolling the traveler 100 relative to the lower track 70 during displacement of the storage unit 120 between the proximal end 72 and the distal end 74 of the lower track 70.

Figure 5:
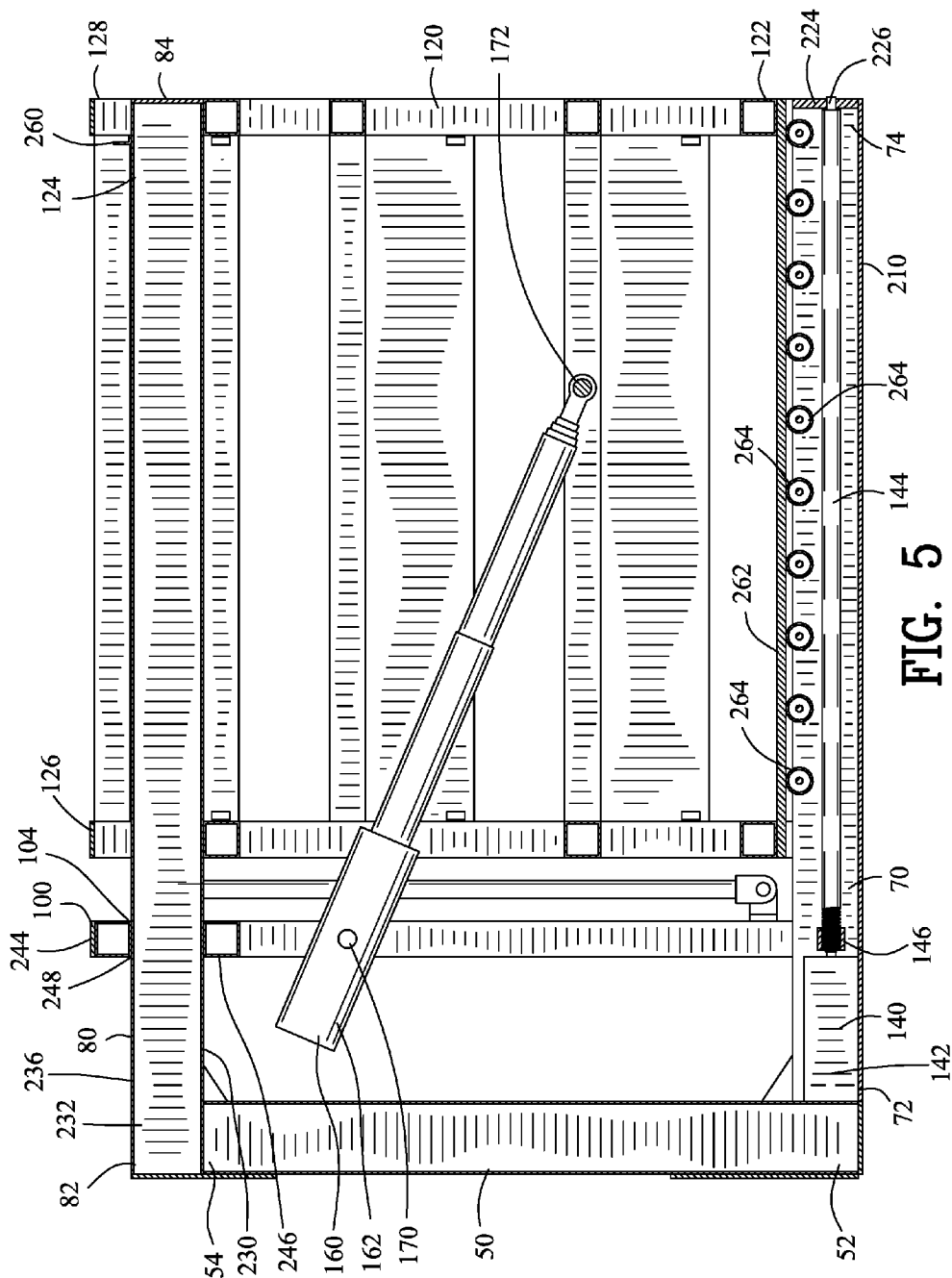
FIG. 5 is a sectional view along line 5-5 in FIG. 2.
Figure 10:
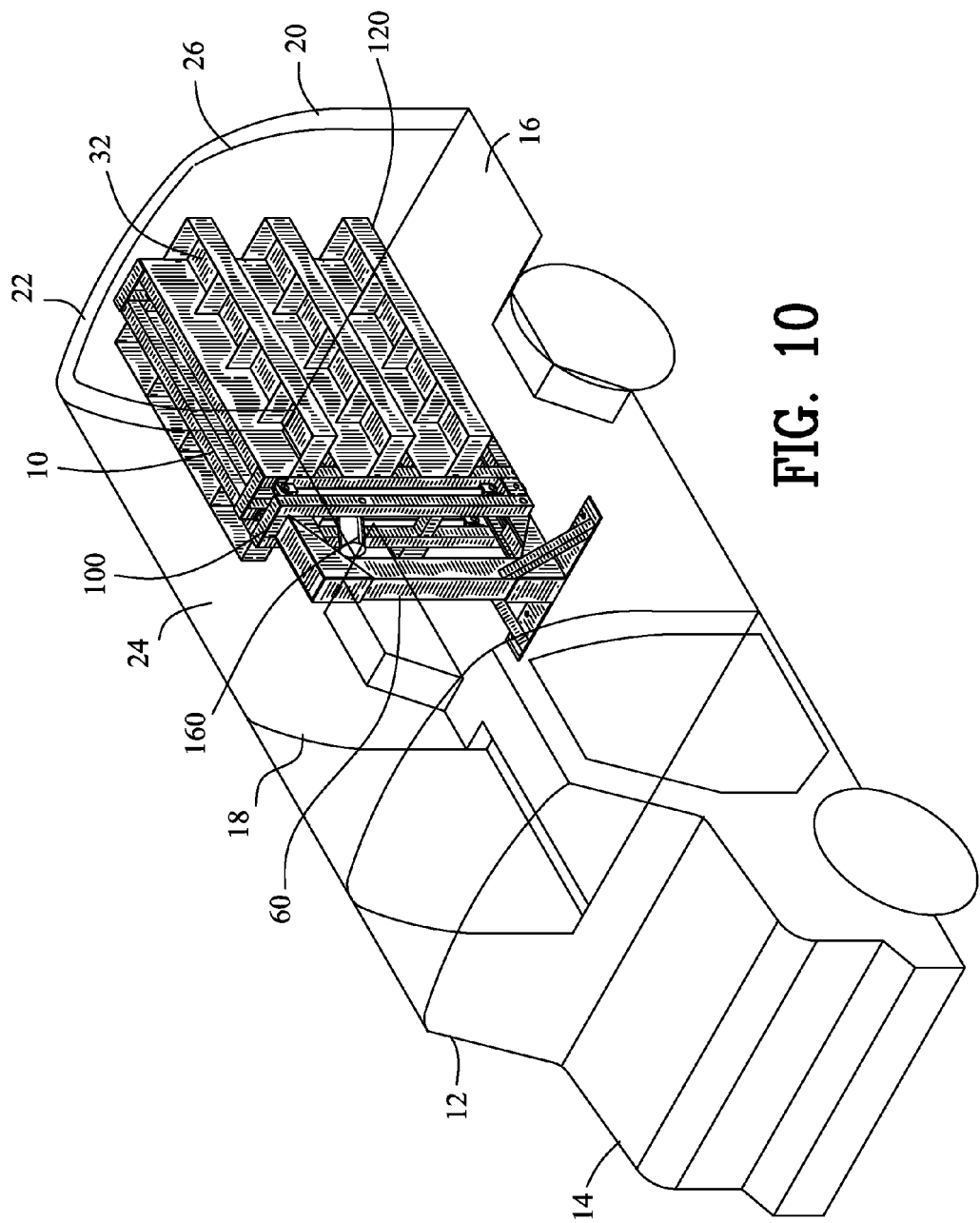
FIG. 10 is a view similar to FIG. 1 illustrating the cargo handling device positioned within a vehicle wherein the traveler position at a proximal end of the cargo handling device.
Figure 11:
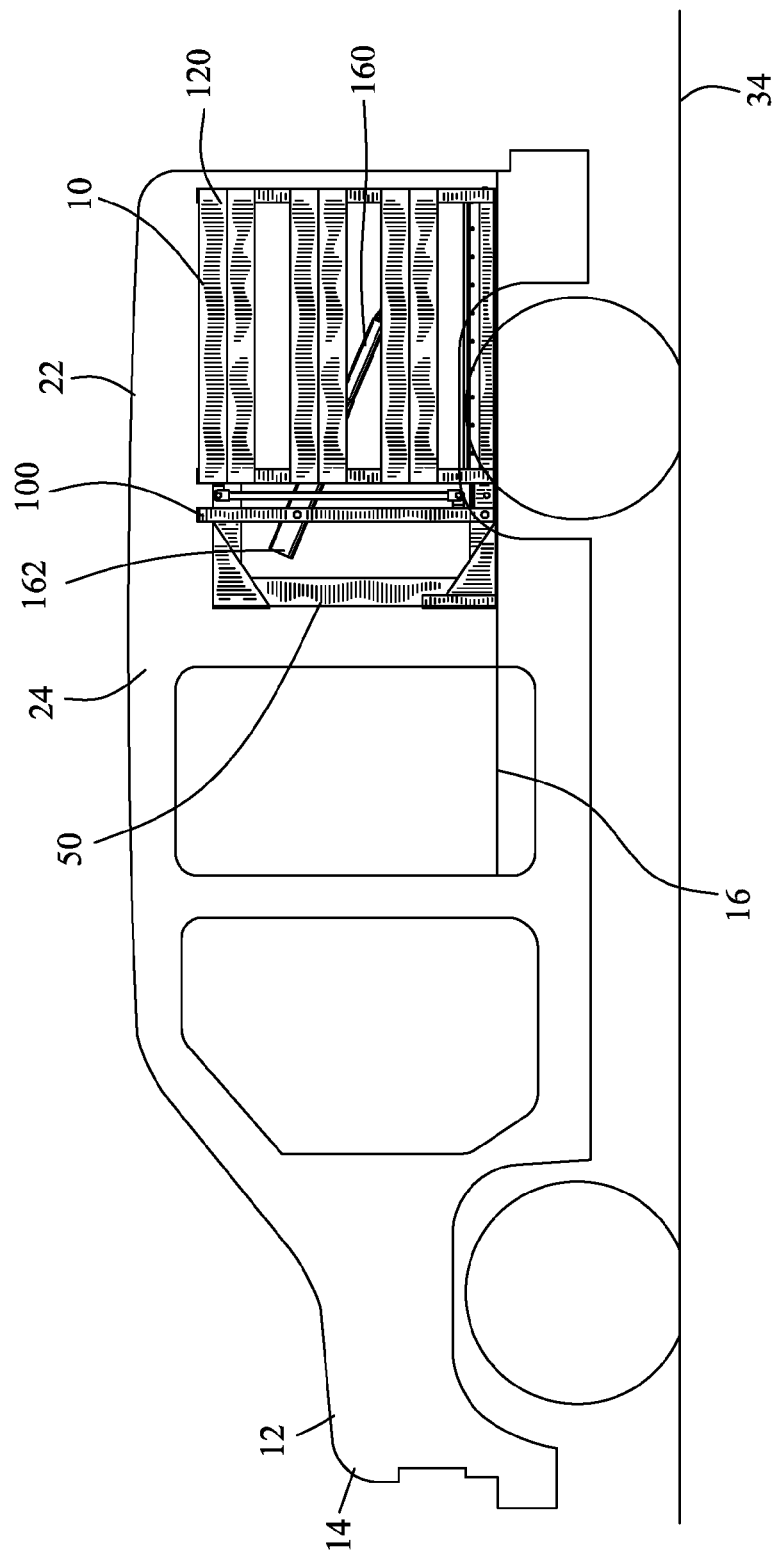
FIG. 11 is a right side view of FIG. 10.
Figure 12:
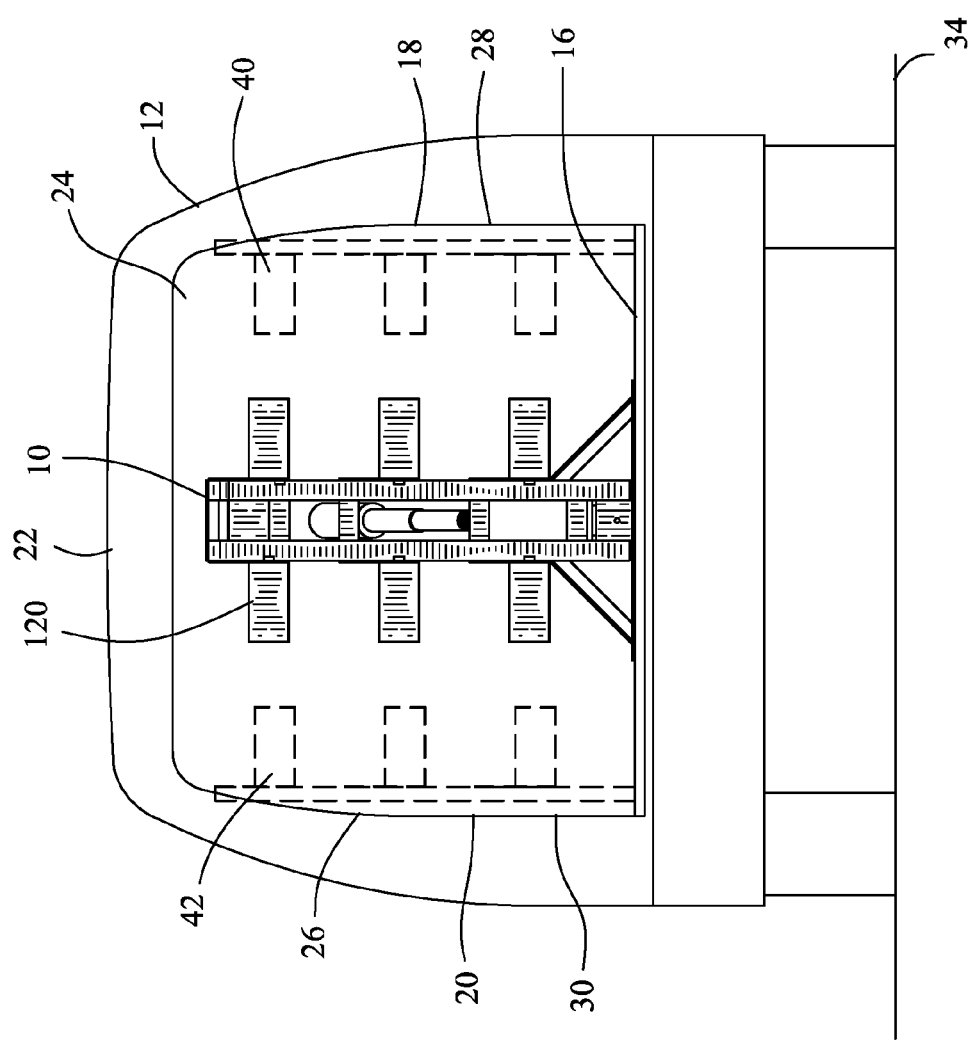
FIG. 12 is a rear view of FIG. 10.
Figure 13:
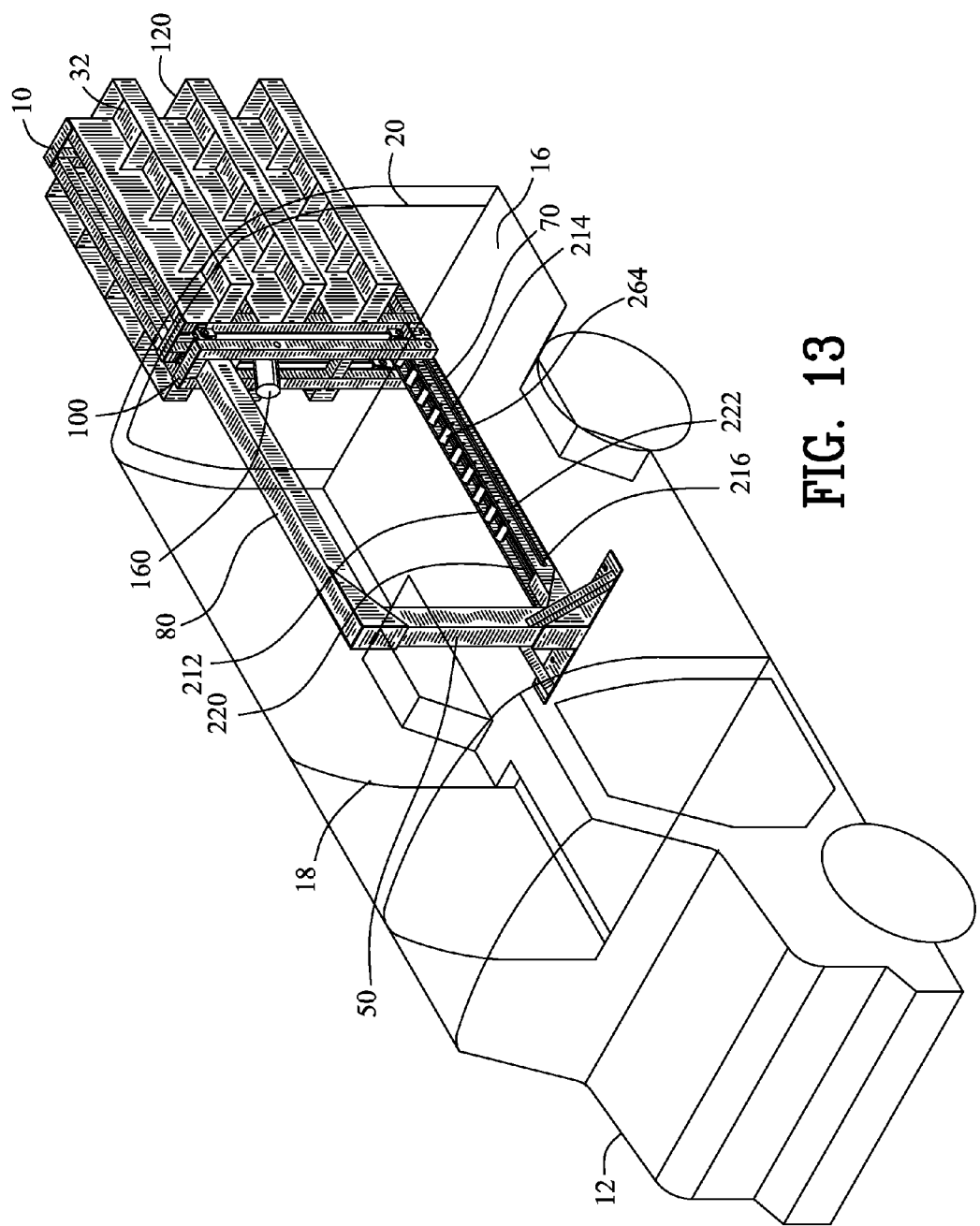
FIG. 13 is a view similar to FIG. 10 illustrating the traveler in a distal end of the cargo handling device.
Figure 14:
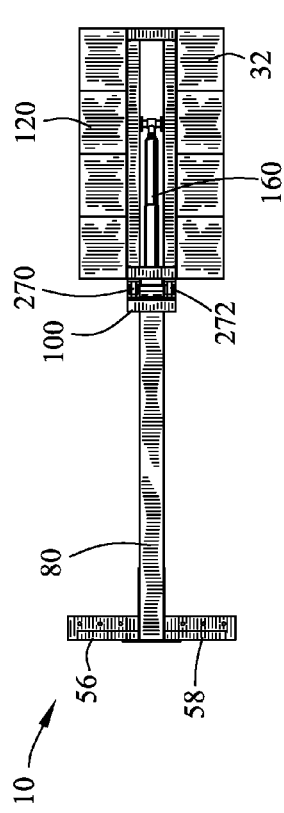
FIG. 14 is a top view of the cargo handling device of FIG. 13.
Figure 15:
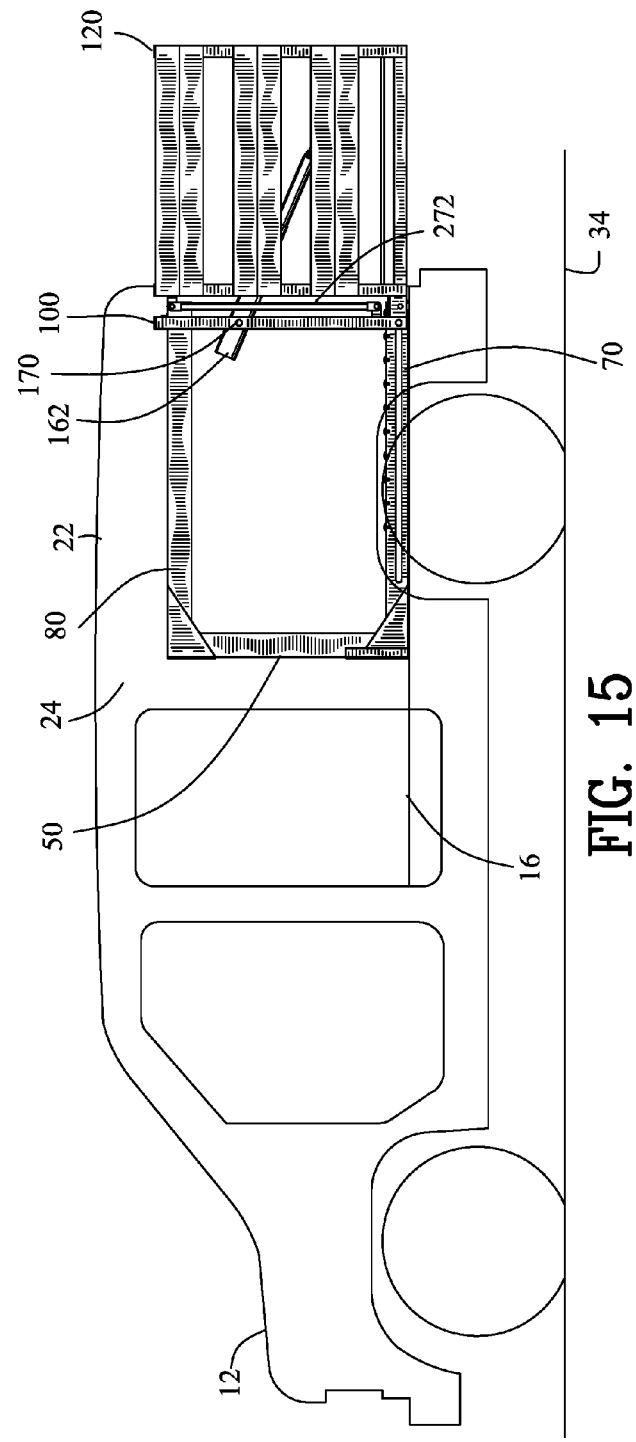
FIG. 15 is a right side view of FIG. 13 illustrating a telescoping actuator in a contracted length for maintaining the traveler abutting the storage unit.
Figure 16:
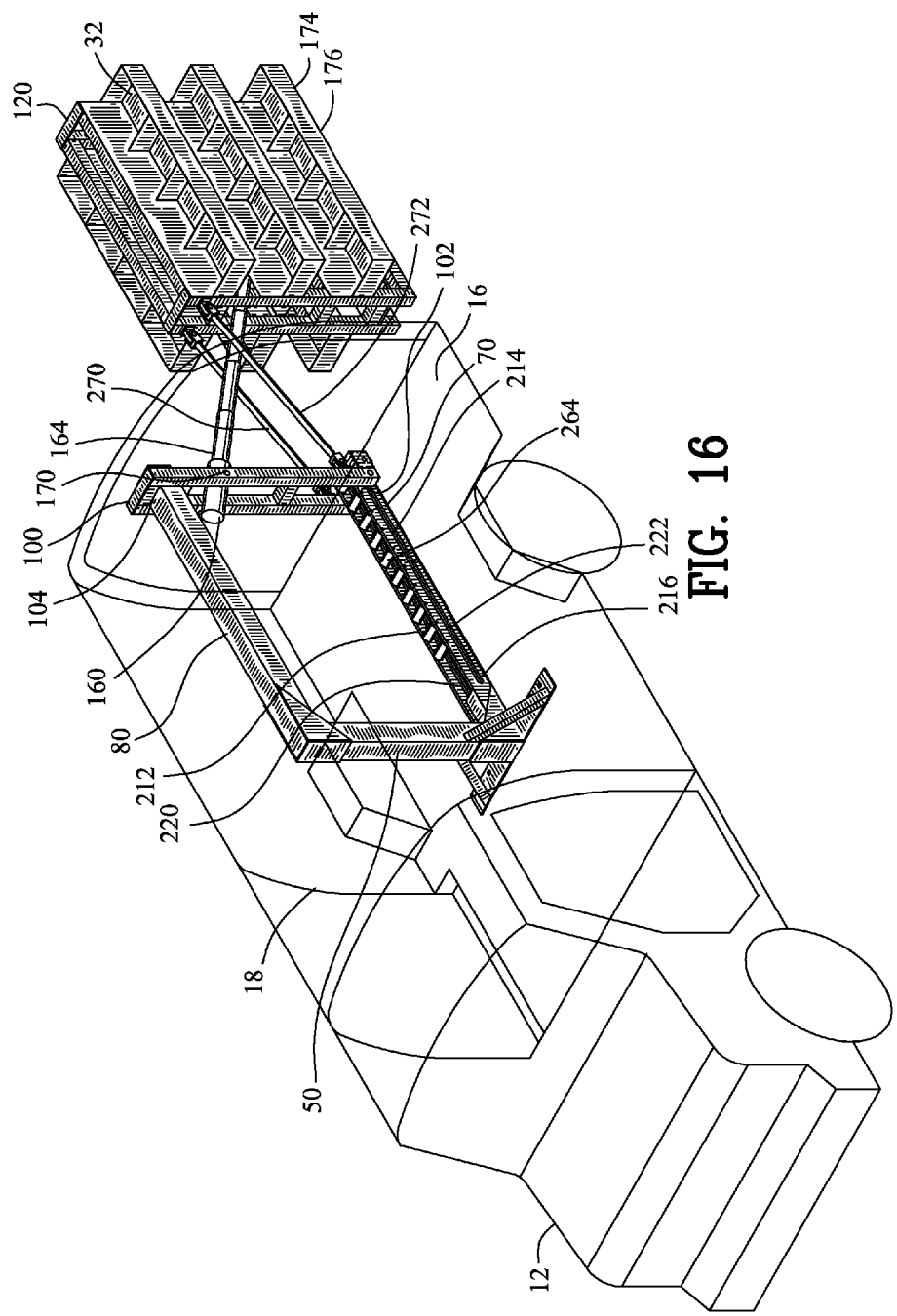
FIG. 16 is a view similar to FIG. 13 illustrating the telescoping actuator in an extended length for displacing the storage unit from the traveler.
Figure 19:
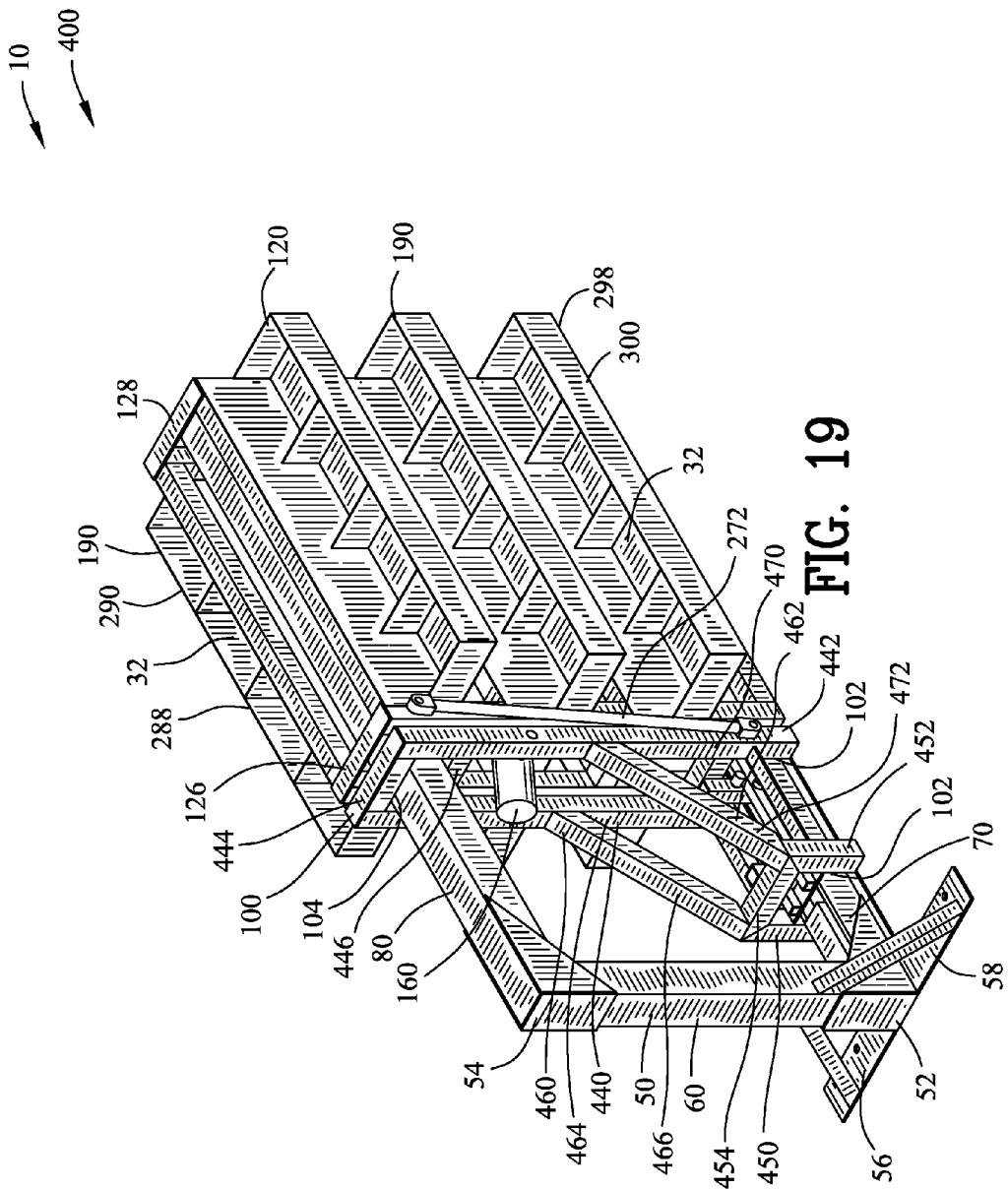
FIG. 19 is an isometric view of a second embodiment of a cargo handling device.

As best shown in FIGS. 5 and 18A a stop plate 260 is coupled to the distal end 84 of the upper track 80. The upper cross frame 244 engages the stop plate 260 when the traveler 100 is in the distal end 74, 84 of the lower track 70 and the upper track 80. The engagement between the stop plate 260 and the upper cross frame 244 prevents disengagement of the traveler 100 from the upper track 80 during the horizontal displacement 174 and the vertical displacement 176 of the storage unit 120 from the traveler 100.

As best shown in FIG. 5, a lower cross frame is secured to the storage unit 120 and extends between the proximal end 126 to the distal end 128. A plurality of rollers 264 are coupled to the first side wall 232 and the second side wall 234 of the lower track 230. The plurality of rollers 264 support and roll the storage unit 120 during displacement of storage unit 120 between the proximal end 72, 82 and the distal end 74, 84 of the lower track 70 and the upper track 80.

A first stabilizing bar 170 is pivotably coupled to the first frame 240 of the traveler 100 and the storage unit 120. Similarly, a second stabilizing bar 272 is pivotably coupled to the second frame 242 of the traveler 100 and the storage unit 120. The first stabilizing bar 170 and the second stabilizing bar 272 in conjunction with the telescoping actuator prevent rotational displacement of the storage unit 120 during the horizontal displacement 174 and the vertical displacement 176 of the storage unit 120 from the traveler 100.

The storage unit 120 includes a first storage frame 280 and a second storage frame 282 coupled by a plurality of cross members 284. A first plurality of storage shelves 286 are coupled to the first storage frame 280. The first plurality of storage shelves 286 may define a first plurality of row and column shelving 288. More specifically, first plurality of storage shelves 286 may include a first plurality of elongated container bins 290 having first divider walls 292 for subdividing each of the shelves 286. A second plurality of storage shelves 296 are coupled to the second storage frame 282 for defining a second plurality of row and column shelving 298. More specifically, second plurality of storage shelves 296 may include a second plurality of elongated container bins 300 having a second divider walls 302 for subdividing each of the shelves 296. The first plurality of row and column shelving 288 and the second plurality of row and column shelving 298 receive the cargo 32. The cargo may include but limited to hand tools, power tools, hardware parts, electrical parts, plumbing parts, air conditioning parts, fasteners, medical equipment, fire control equipment, hazardous material equipment.

The first plurality of storage shelves 286 and the second plurality of storage shelves 296 may be removably coupled to the storage unit 120. More specifically, a first plurality of hangers 310 are coupled to the first storage frame 280. The first plurality of hangers 310 may include a general J-shape 312. A first plurality of hanger receivers 314 are coupled to the first plurality of storage shelves 286. The first plurality of hanger receivers 314 may include a general inverted J-shape. The first plurality of hanger receivers 312 engage the first plurality of hangers 310 for removably coupling the first plurality of storage shelves 286 to the first storage flame 280.

Similarly, a second plurality of hangers 320 are coupled to the second storage frame 282. The second plurality of hangers 320 may include a general J-shape 322. A second plurality of hanger receivers 324 are coupled to the second plurality of storage shelves 296. The second plurality of hanger receivers 324 may include a general inverted J-shape 326. The second plurality of hanger receivers 324 engage the second plurality of hangers 320 for removably coupling the second plurality of storage shelves 296 to the second storage frame 282. In addition first plurality of storage shelves 286 and the second plurality of storage shelves 296 may include various height dimensions, width dimensions and depth dimensions for customizing the cargo handling device 10 for the application.

FIGS. 19-27 illustrate a second embodiment 400 of the present invention. The lower track 70 includes a base wall 410, a first general T-shape 412 and a second general T-shape 414. The first general T-shape 412 is coupled to the base wall 410 for defining a first I-beam 416. The second general T-shape 414 is coupled to the base wall 410 for defining a second I-beam 418. The first I-beam 416 and the second I-beam 418 define a beam channel 420 there between. The base wall 410 is coupled to the cargo surface 16.

Figure 29:
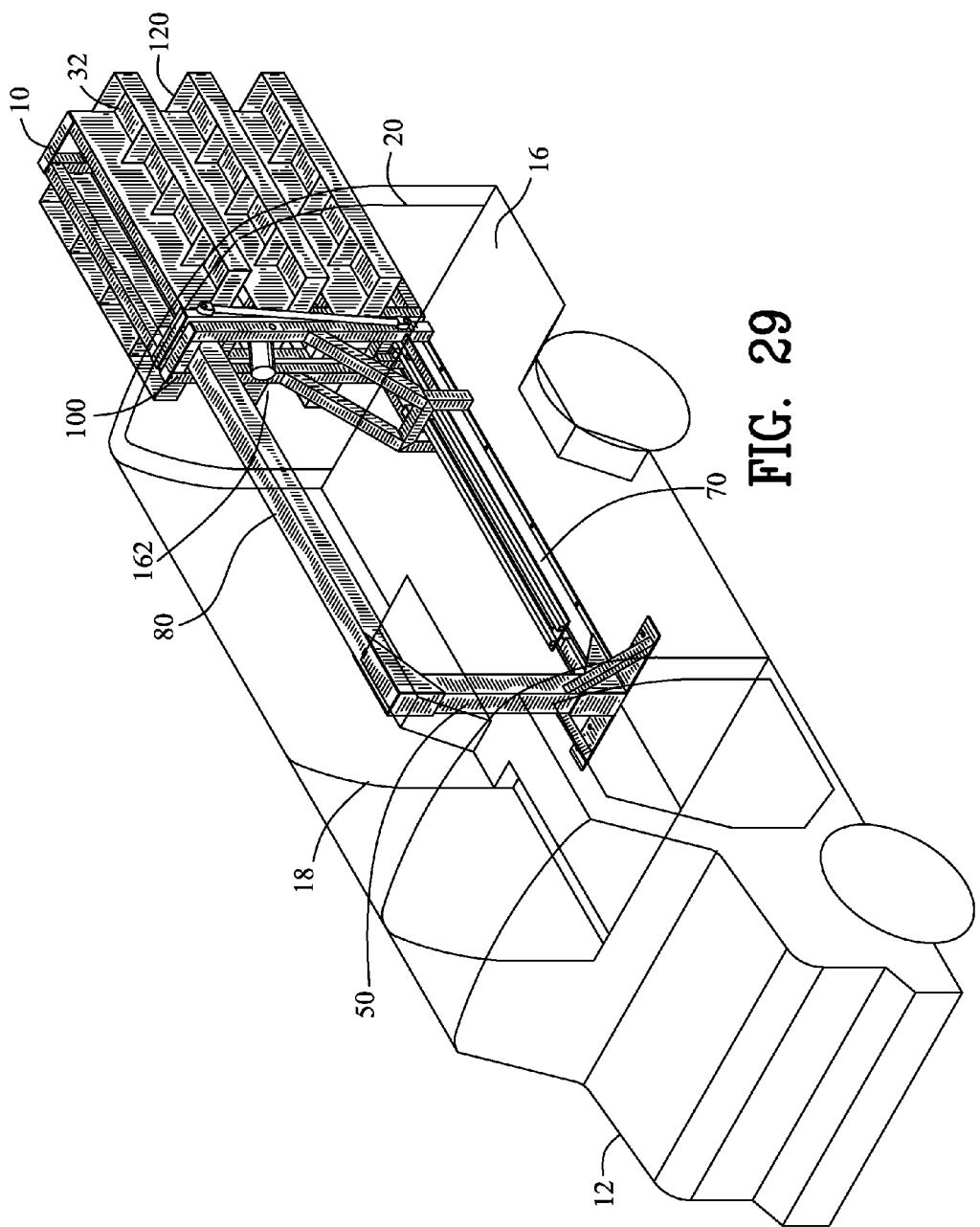
FIG. 29 is a view similar to FIG. 28 illustrating the traveler in a distal end of the cargo handling device.
Figures 30, 31:
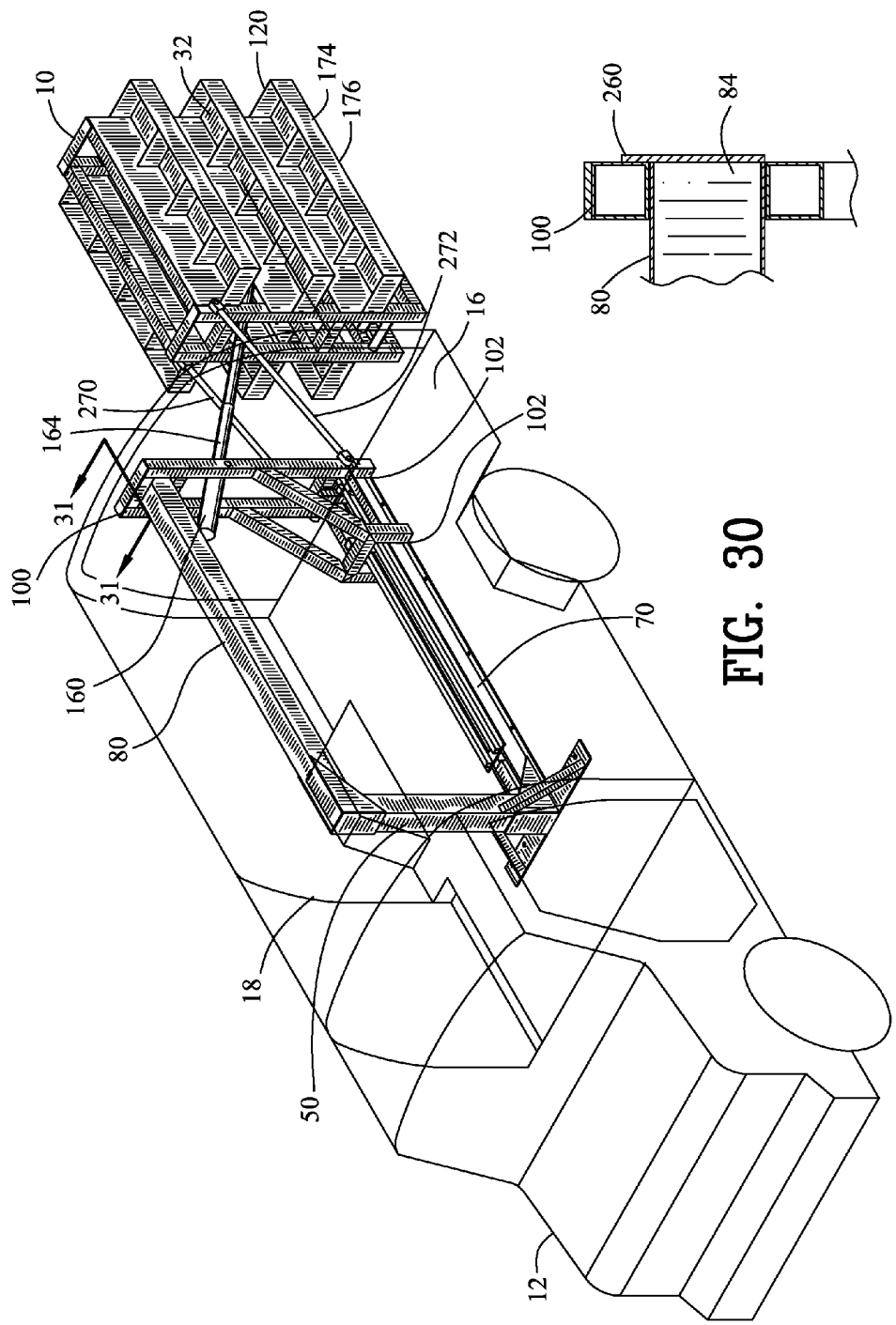
FIG. 30 is a view similar to FIG. 29 illustrating the telescoping actuator in an extended length for displacing the storage unit from the traveler.
FIG. 31 is a sectional view along line 31-31 in FIG. 30 illustrating the stop plate coupled to the upper track and engaging the traveler for preventing disengagement of the traveler from the upper track.

The upper track 80 includes a lower wall 430, a first side wall 432, a second side wall 434 and an upper wall 436. The traveler 100 includes a first rear frame 440, a second rear frame 442, an upper rear cross frame 444 and a lower rear cross frame 446. The traveler 100 further includes a first front frame 450, a second front frame 452 and a lower front cross frame 454. A primary frame bar 460 couples the first rear frame 440 with the first front frame 450. A secondary frame bar 462 couples the second rear frame 442 with the second front frame 452. Preferably, the angle between the first rear frame 440 and the primary frame bar 460 is a primary acute angle 464. Also preferably, a primary ratio of height 466 between the first rear frame 440 to the first front frame 450 is 5 to 1 respectively. The primary acute angle 464 and the primary ratio of height 466 reinforces the traveler 100 when the storage unit 120 is positioned in both the cantilevered positioned as shown in FIG. 29 and adjacent to the surface 34 as shown in FIG. 30. Similarly, the angle between the second rear frame 442 and the secondary frame bar 462 is a secondary acute angle 470. Also preferably, a secondary ratio of height 472 between the second rear frame 442 to the second front frame 452 is 5 to 1 respectively. The secondary acute angle 470 and the secondary ratio of height 472 reinforces the traveler 100 when the storage unit 120 is positioned in both the cantilevered positioned as shown in FIG. 29 and adjacent to the surface 34 as shown in FIG. 30.

The first rear frame 440 is positioned adjacent to the first I-beam 412 of the lower track 70 and the first side wall 432 of the upper track 430. The first front frame 450 is positioned adjacent to the first I-beam 412 of the lower track 70. The second rear frame 442 is positioned adjacent to the second I-beam 418 of the lower track 70 and the second side wall 434 of the upper track 80. The second front frame 452 is positioned adjacent to the second I-beam 418 of the lower track 70.

A rear traveler arm 480 is secured to the lower rear cross frame 446 and extends into the beam channel 420. A front traveler arm 482 is secured to the lower front cross frame 454 and extends into the beam channel 420. The threaded aperture 106 defines a rear threaded aperture 484 in the rear traveler arm 480 and a front threaded aperture 486 in the front traveler arm 482.

As best shown in FIGS. 25 and 26, the first rear frame 440 includes an upper roller 490 and a lower roller 492 for positioning the first I-beam 416 there between. The first front frame 450 also includes an upper roller 490 and a lower roller 492 for positioning the first I-beam 416 there between. The second rear frame 442 includes an upper roller 490 and a lower roller 492 for positioning the second I-beam 418 there between. The second front frame 452 also includes an upper roller 490 and a lower roller 492 for positioning the second I-beam 418 there between. The upper roller 490 and the lower roller 492 of the first rear frame 440, the first front frame 450, the second rear frame 442 and the second front frame 452 roll and support the traveler 100 relative to the lower track 70 during displacement of the storage unit 120 between the proximal end 72 and the distal end 74 of the lower track 70.

As best shown in FIGS. 25 and 26, the rear traveler arm 480 includes a primary upper roller 494 and a secondary upper roller 496 for positioning on the first I-beam 416 and the second I-beam 418 respectively. The front traveler arm 482 includes a primary upper roller 494 and a secondary upper roller 496 for positioning on the first I-beam 416 and the second I-beam 418 respectively. The primary upper roller 494 and a secondary upper roller 496 of the rear traveler arm 480 and the front traveler arm 482 roll and support the traveler 100 relative to the lower track 70 during displacement of the storage unit 120 between the proximal end 72 and the distal end 74 of the lower track 70.

Similar to the first embodiment and as best shown in FIG. 31, a stop plate 260 is coupled to the distal end 84 of the upper track 80. The upper cross frame 244 engages the stop plate 260 when the traveler 100 is in the distal end 74, 84 of the lower track 70 and the upper track 80. The engagement between the stop plate 260 and the upper cross frame 244 prevents disengagement of the traveler 100 from the upper track 80 during the horizontal displacement 174 and the vertical displacement 176 of the storage unit 120 from the traveler 100.

A first stabilizing bar 170 is pivotably coupled to the first rear frame 440 of the traveler 100 and the storage unit 120. Similarly, a second stabilizing bar 272 is pivotably coupled to the second rear frame 442 of the traveler 100 and the storage unit 120. The first stabilizing bar 170 and the second stabilizing bar 272 in conjunction with the telescoping actuator prevent rotational displacement of the storage unit 120 during the horizontal displacement 174 and the vertical displacement 176 of the storage unit 120 from the traveler 100.

The storage unit 120 includes a first storage frame 280 and a second storage frame 282 coupled by a plurality of cross members 284. A first plurality of storage shelves 286 are coupled to the first storage frame 280. The first plurality of storage shelves 286 may define a first plurality of row and column shelving 288. More specifically, first plurality of storage shelves 286 may include a first plurality of elongated container bins 290 having first divider walls 292 for subdividing each of the shelves 286. A second plurality of storage shelves 296 are coupled to the second storage frame 282 for defining a second plurality of row and column shelving 298. More specifically, second plurality of storage shelves 296 may include a second plurality of elongated container bins 300 having a second divider walls 302 for subdividing each of the shelves 296. The first plurality of row and column shelving 288 and the second plurality of row and column shelving 298 receive the cargo 32. The cargo may include but limited to hand tools, power tools, hardware parts, electrical parts, plumbing parts, air conditioning parts, fasteners, medical equipment, fire control equipment, hazardous material equipment.

The first plurality of storage shelves 286 and the second plurality of storage shelves 296 may be removably coupled to the storage unit 120. More specifically, a first plurality of hangers 310 are coupled to the first storage frame 280. The first plurality of hangers 310 may include a general J-shape 312. A first plurality of hanger receivers 314 are coupled to the first plurality of storage shelves 286. The first plurality of hanger receivers 314 may include a general inverted J-shape. The first plurality of hanger receivers 312 engage the first plurality of hangers 310 for removably coupling the first plurality of storage shelves 286 to the first storage frame 280.

Similarly, a second plurality of hangers 320 are coupled to the second storage frame 282. The second plurality of hangers 320 may include a general J-shape 322. A second plurality of hanger receivers 324 are coupled to the second plurality of storage shelves 296. The second plurality of hanger receivers 324 may include a general inverted J-shape 326. The second plurality of hanger receivers 324 engage the second plurality of hangers 320 for removably coupling the second plurality of storage shelves 296 to the second storage frame 282. In addition first plurality of storage shelves 286 and the second plurality of storage shelves 296 may include various height dimensions, width dimensions and depth dimensions for customizing the cargo handling device 10 for the application.

Figure 23:
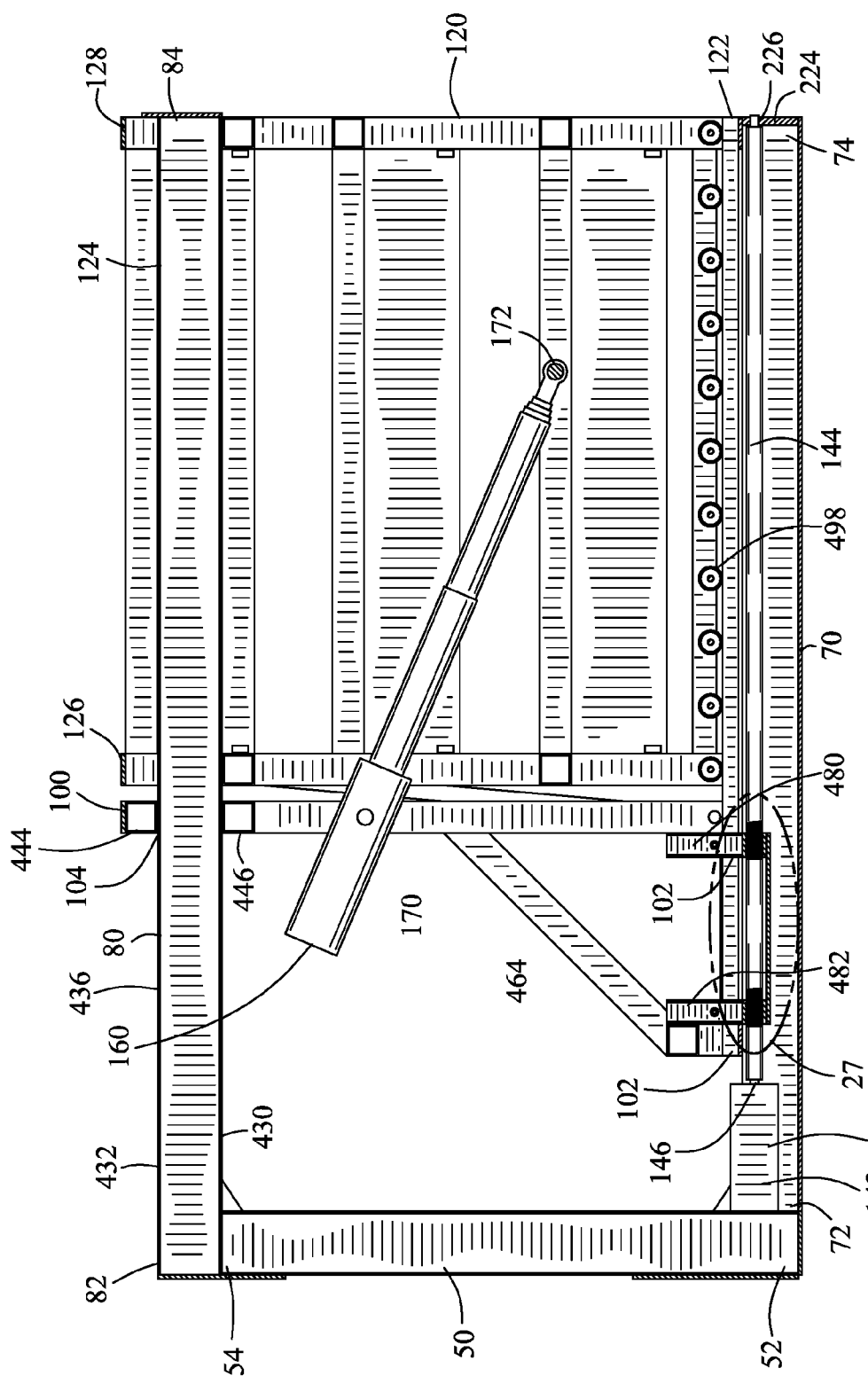
FIG. 23 is a sectional view along line 23-23 in FIG. 20.
Figure 24:
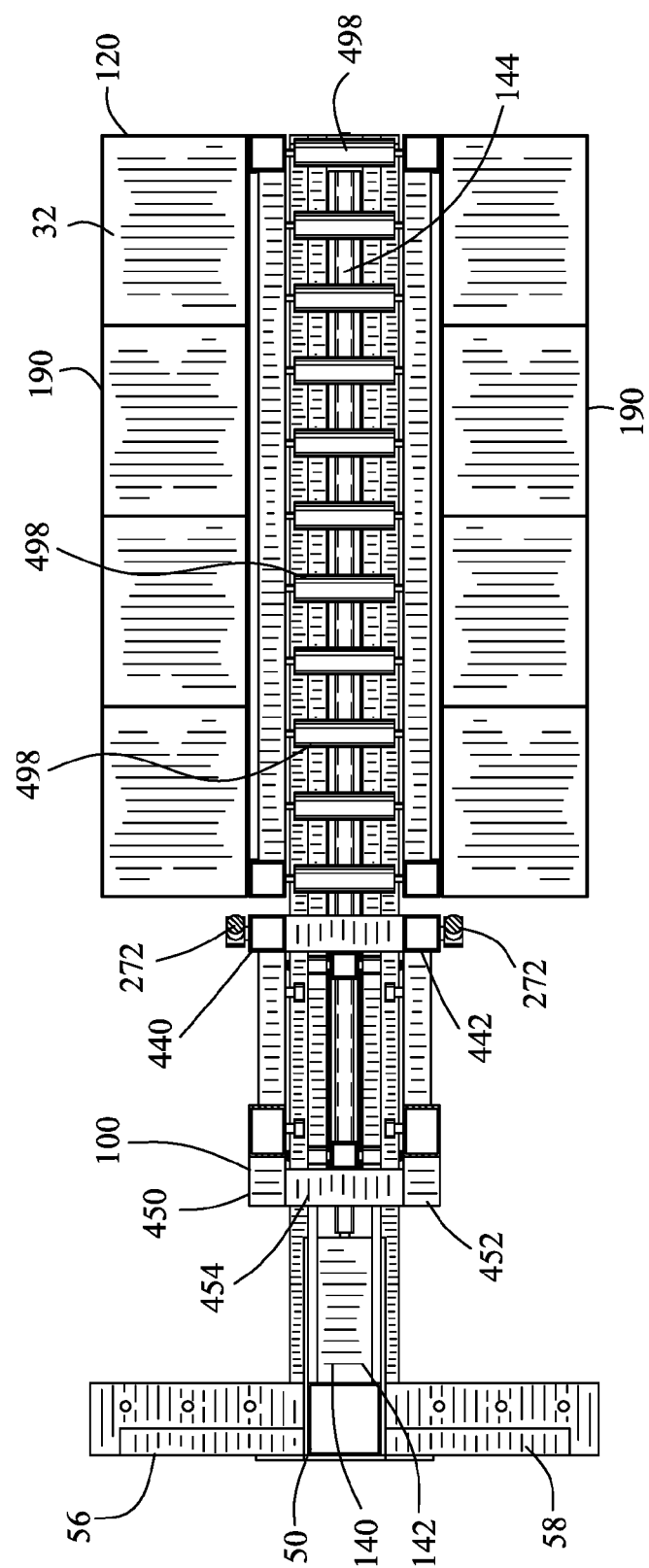
FIG. 24 is a sectional view along line 24-24 in FIG. 21.
Figure 28:
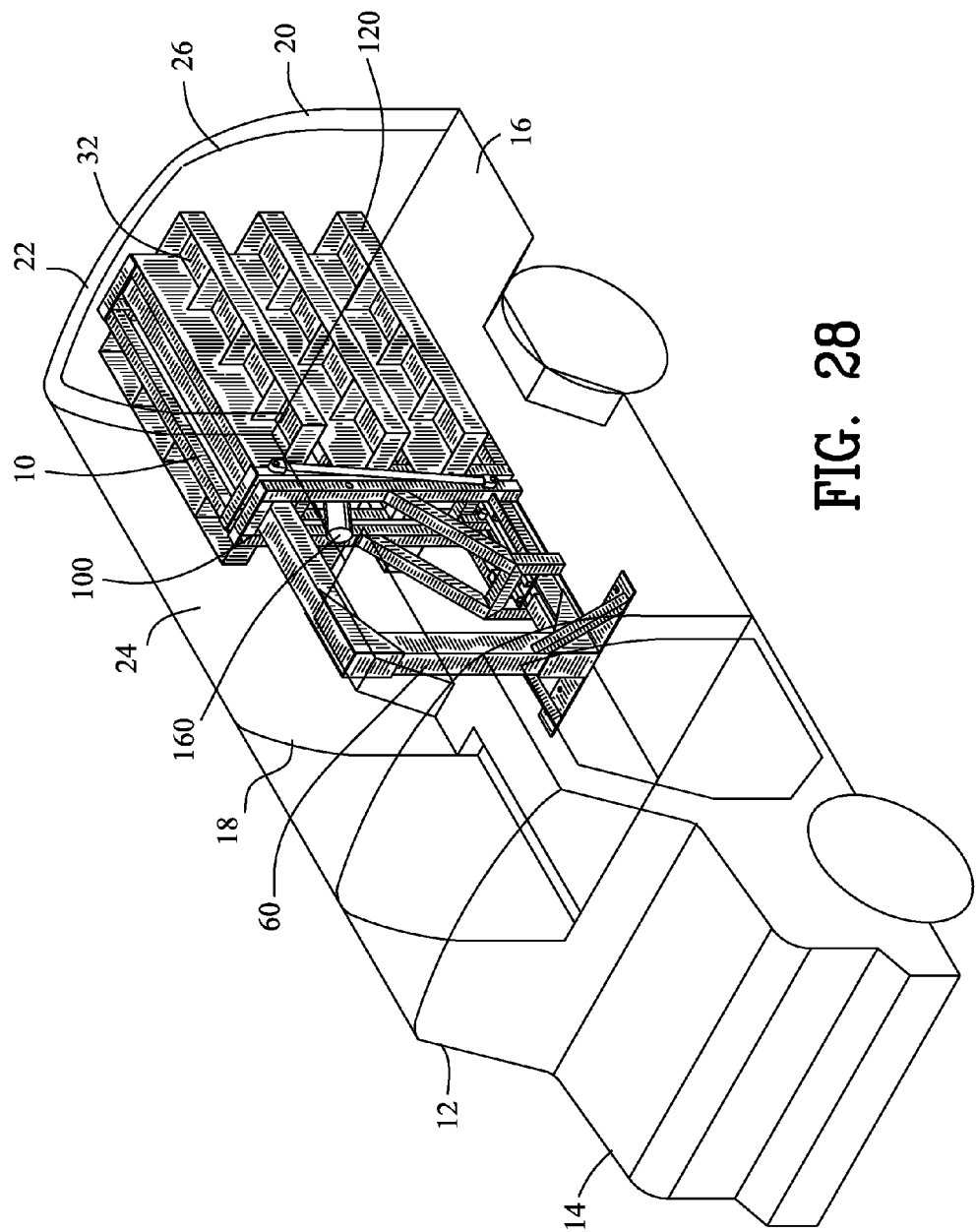
FIG. 28 is a view similar to FIG. 19 illustrating the cargo handling device positioned within a vehicle wherein the traveler position at a proximal end of the cargo handling device.

As best shown in FIG. 23, a plurality of rollers 498 are coupled to the first storage frame 280 and the second storage frame 280. The plurality of rollers 498 support and roll the storage unit 120 during displacement of storage unit 120 between the proximal end 72, 82 and the distal end 74, 84 of the lower track 70 and the upper track 80.

The subject invention further includes a method for cargo handling with a vehicle 12. The method comprises the steps of activating a linear actuator 140 engaging the base 50 and a traveler 100. The traveler 100 is displaced from a proximal end 72, 82 and to a distal end 74, 84 of a lower track 70 and an upper track 80 by the linear actuator 140. A storage unit 120 is displaced from the proximal end 72 as shown in FIGS. 1, 13, and 19-28 to a cantilever position 500 as shown in FIGS. 13-15, and 29 above the surface 34 and beyond the distal end 74, 84, of a lower track 70 and an upper track 80 by coupling with the traveler 100.

The linear actuator 140 is deactivated upon the traveler 100 positioned at the distal end 74, 84 of the lower track 70 and the upper track 80. A telescoping actuator 160 is activated that engages the traveler 100 and the storage unit 120. As shown in FIGS. 16-18 and 30, the storage unit 120 is displaced from the traveler 100 including a horizontal displacement 174 and a vertical displacement 176 by the telescoping actuator 160. The telescoping actuator 160 is deactivated upon positioning the storage unit 120 adjacent the surface 34.

The method further includes the steps of activating the telescoping actuator 160 engaging the traveler 100 and the storage unit 120. The storage unit 120 is displaced including a horizontal displacement 174 and a vertical displacement 176 from adjacent the surface 34 by the telescoping actuator 160. The telescoping actuator 160 is deactivated upon the storage unit 120 positioned adjacent to the traveler 100. The linear actuator 140 is activated engaging the base 50 and the traveler 100. The traveler 100 is displaced from the distal end 74, 84 and to the proximal end 72, 82 of the lower track 70 and the upper track 80 by the linear actuator 140. The storage unit 120 is displaced from the cantilever position 500 above the surface 34 and beyond the distal end 74, 84 of a lower track 70 and an upper track 80 and to the proximal end 72, 82 by coupling with the traveler 100. The linear actuator 140 is deactivated upon the traveler 100 positioned at the proximal end 72, 82 of the lower track 70 and the upper track 80.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A cargo handling device for a vehicle, the vehicle having a cargo surface, the vehicle transporting a cargo over a surface, the cargo handling device, comprising:
a base extending between a lower end and an upper end;
said lower end of said base coupled to the cargo surface;
a lower track extending between a proximal end and a distal end;
said proximal end of said lower track coupled to said base;
an upper track extending between a proximal end and a distal end;
said proximal end of said upper track coupled to said base;
a traveler having a lower track receiver and an upper track receiver;
said lower track receiver of said traveler slidably engaging said lower track between said proximal end and said distal end of said lower track;
said upper track receiver of said traveler slidably engaging said upper track between said proximal end and said distal end of said upper track;
a storage unit having a lower track receiver and an upper track receiver and extending between a proximal end and a distal end;
said lower track receiver of said storage unit slidably engaging said lower track between said proximal end and said distal end of said lower track;
said upper track receiver of said storage unit slidably engaging said upper track between said proximal end and said distal end of said upper track;
a linear actuator engaging said base and said traveler for displacing said traveler along said lower track and said upper track between said proximal end and said distal end of said lower track and said upper track;
a telescoping actuator defining a contracted length and an extended length;
an upper actuator pivot pivotably coupling said telescoping actuator to said traveler,
a lower actuator pivot pivotably coupling said telescoping actuator to said storage unit;
said contracted length in said telescoping actuator maintaining said traveler abutting said proximal end of said storage unit during displacement of said traveler between said proximal end and said distal end of said lower track and said upper track;
said extended length in said telescoping actuator displacing said storage unit from said traveler upon said traveler positioned at said distal end of said lower track and said upper track;
said extended length defining a horizontal displacement and a vertical displacement of said storage unit from said traveler for positioning said storage unit adjacent the surface; and
a cargo receiver coupled to said storage unit for engaging the cargo.

2. A cargo handling device for a vehicle as set forth in claim 1, further including a primary base plate coupled to said base;
a secondary base plate coupled to said base;
said primary base plate, said secondary base plate and said base defining an inverted T-shape;
said inverted T-shape coupled to the cargo surface; and
said inverted T-shape preventing lateral displacement of said lower track, said upper track and said base.

3. A cargo handling device for a vehicle as set forth in claim 1, wherein said linear actuator includes a motor and a threaded rod;
said motor coupled to said base and providing a rotational force;
said threaded rod coupled to said motor for rotating said threaded rod with said rotational force;
a threaded aperture in said traveler for threadably engaging said threaded rod; and
said rotational force causing said traveler to be linearly displaced between said proximal end and said distal end of said lower track and said upper track.

4. A cargo handling device for a vehicle as set forth in claim 3, wherein said lower track includes a base wall, a first side wall and a second side wall for defining a general C-shape;
said base wall coupled to the cargo surface;
said first side wall including a first elongated slot;
said second side wall including a second elongated slot;
said upper track includes a lower wall, a first side wall, a second side wall and an upper wall;
said traveler including a first frame, a second frame and an upper cross frame;
said first frame positioned adjacent to said first side wall of said lower track and said first side wall of said upper track;
said second frame positioned adjacent to said second side wall of said lower track and said second side wall of said upper track;
a traveler pin secured to said first frame and a second frame and traversing said first elongated slot and said second elongated slot;
said threaded aperture in said traveler pin; and
said traveler pin slidably engaging along said first elongated slot and said second elongated slot during displacement of said traveler between said proximal end and said distal end of said lower track and said upper track.

5. A cargo handling device for a vehicle as set forth in claim 3, further including a first traveler wheel coupled to said first frame and contacting the cargo surface;
a second traveler wheel coupled to said second frame and contacting the cargo surface; and
said first traveler wheel and said second traveler wheel rolling said traveler relative to said lower track during displacement of said storage unit between said proximal end and said distal end of said lower track.

6. A cargo handling device for a vehicle as set forth in claim 4, wherein said upper cross frame is secured to said first frame and said second frame;
said upper cross frame positioned above said upper track;
a stop plate coupled to said distal end of said upper track; and
said upper cross frame engaging said stop plate during said traveler in said distal end of said lower track and said upper track for preventing disengagement of the traveler from said upper track during said horizontal displacement and said vertical displacement of said storage unit from said traveler.

7. A cargo handling device for a vehicle as set forth in claim 4, further including a lower cross frame secured to said storage unit;
a plurality of rollers coupled to said first side wall and said second side wall of said lower track; and
said plurality of rollers supporting and rolling said storage unit during displacement of storage unit between said proximal end and said distal end of said lower track and said upper track.

19

8. A cargo handling device for a vehicle as set forth in claim 4, further including a first stabilizing bar pivotably coupled to said first frame of said traveler and said storage unit;
    a second stabilizing bar pivotably coupled to said second frame of said traveler and said storage unit; and
    said first stabilizing bar and said second stabilizing bar preventing rotational displacement of said storage unit during said horizontal displacement and said vertical displacement of said storage unit from said traveler.

9. A cargo handling device for a vehicle as set forth in claim 1, wherein said storage unit includes a first storage frame and a second storage frame coupled by a plurality of cross members;
    a first plurality of storage shelves coupled to said first storage frame for defining a first plurality of row and column shelving;
    a second plurality of storage shelves coupled to said second storage frame for defining a second plurality of row and column shelving; and
    said first plurality of row and column shelving and said second plurality of row and column shelving receiving the cargo.

10. A cargo handling device for a vehicle as set forth in claim 9, further including a first plurality of hangers coupled to said first storage frame;
    a first plurality of hanger receivers coupled to said first plurality of storage shelves;
    said first plurality of hanger receivers engaging said first plurality of hangers for removably coupling said first plurality of storage shelves to said first storage frame;
    a second plurality of hangers coupled to said second storage frame;
    a second plurality of hanger receivers coupled to said second plurality of storage shelves; and
    said second plurality of hanger receivers engaging said second plurality of hangers for removably coupling said second plurality of storage shelves to said second storage frame.

11. A cargo handling device for a vehicle as set forth in claim 3, wherein said lower track includes a base wall, a first general T-shape and a second general T-shape;
    said first general T-shape coupled to said base wall for defining a first I-beam;
    said second general T-shape coupled to said base wall for defining a second I-beam;
    said first K-beam and said second I-beam defining a beam channel there between;
    said base wall coupled to the cargo surface;
    said upper track includes a lower wall, a first side wall, a second side wall and an upper wall;
    said traveler including a first rear frame, a second rear frame, an upper rear cross frame and a lower rear cross frame;
    said traveler including a first front frame, a second front frame and a lower front cross frame;
    a primary frame bar coupling said first rear frame with said first front frame;
    a secondary frame bar coupling said second rear frame with said second front frame;
    said first rear frame positioned adjacent to said first I-beam of said lower track and said first side wall of said upper track;
    said first front frame positioned adjacent to said first I-beam of said lower track;

20 said second rear frame positioned adjacent to said second I-beam of said lower track and said second side wall of said upper track;
    said second front frame positioned adjacent to said second I-beam of said lower track;
    a rear traveler arm secured to said lower rear cross frame and extending into said beam channel;
    a front traveler arm secured to said lower front cross frame and extending into said beam channel; and
    said threaded aperture defining a rear threaded aperture in said rear traveler arm and a front threaded aperture in said front traveler arm.

12. A cargo handling device for a vehicle as set forth in claim 11, wherein said first rear frame includes an upper roller and a lower roller for positioning said first I-beam there between;
    said first front frame includes an upper roller and a lower roller for positioning said first I-beam there between;
    said second rear frame includes an upper roller and a lower roller for positioning said second I-beam there between;
    said second front frame includes an upper roller and a lower roller for positioning said second I-beam there between; and
    said upper roller and said lower roller of said first rear frame, said first front frame, said second rear frame and said second front frame rolling said traveler relative to said lower track during displacement of said storage unit between said proximal end and said distal end of said lower track.

13. A cargo handling device for a vehicle as set forth in claim 11, wherein said rear traveler arm includes a primary upper roller and a secondary upper roller for positioning on said first I-beam and said second I-beam respectively;
    said front traveler arm includes a primary upper roller and a secondary upper roller for positioning on said first I-beam and said second I-beam respectively; and
    said primary upper roller and a secondary upper roller of said rear traveler arm and said front traveler arm rolling said traveler relative to said lower track during displacement of said storage unit between said proximal end and said distal end of said lower track.

14. A cargo handling device for a vehicle as set forth in claim 11, wherein said upper cross frame is secured to said first frame and said second frame;
    said upper cross frame positioned above said upper track;
    a stop plate coupled to said distal end of said upper track; and
    said upper cross frame engaging said stop plate during said traveler in said distal end of said lower track and said upper track for preventing disengagement of the traveler from said upper track during said horizontal displacement and said vertical displacement of said storage unit from said traveler.

15. A cargo handling device for a vehicle as set forth in claim 11, further including a first stabilizing bar pivotably coupled to said first rear frame of said traveler and said storage unit;
    a second stabilizing bar pivotably coupled to said second rear frame of said traveler and said storage unit; and
    said first stabilizing bar and said second stabilizing bar preventing rotational displacement of said storage unit during said horizontal displacement and said vertical displacement of said storage unit from said traveler.

16. A cargo handling device for a vehicle as set forth in claim 11, wherein said storage unit includes a first storage frame and a second storage frame coupled by a plurality of cross members;
   a first plurality of storage shelves coupled to said first storage frame for defining a first plurality of row and column shelving;
   a second plurality of storage shelves coupled to said second storage frame for defining a second plurality of row and column shelving; and
   first plurality of row and column shelving and said second plurality of row and column shelving receiving the cargo.

17. A cargo handling device for a vehicle as set forth in claim 16, further including a first plurality of hangers coupled to said first storage frame;
   a first plurality of hanger receivers coupled to said first plurality of storage shelves;
   said first plurality of hanger receivers engaging said first plurality of hangers for removably coupling said first plurality of storage shelves to said first storage frame;
   a second plurality of hangers coupled to said second storage frame;
   a second plurality of hanger receivers coupled to said second plurality of storage shelves; and
   said second plurality of hanger receivers engaging said second plurality of hangers for removably coupling said second plurality of storage shelves to said second storage frame.

18. A cargo handling device for a vehicle as set forth in claim 16, further including a plurality of rollers coupled to said first storage frame and said second storage frame; and
   said plurality of rollers supporting and rolling said storage unit during displacement of storage unit between said proximal end and said distal end of said lower track and said upper track.

19. A method for cargo handling with a vehicle, the vehicle having a cargo surface, the vehicle transporting a cargo over a surface, the method comprising the steps of:
   activating a linear actuator engaging a base and a traveler;
   displacing said traveler from a proximal end and to a distal end of a lower track and an upper track by said linear actuator;
   displacing a storage unit from said proximal end and to a cantilever position above the surface and beyond said distal end of a lower track and an upper track by coupling with said traveler;
   deactivating said linear actuator upon said traveler positioned at said distal end of said lower track and said upper track;
   activating a telescoping actuator engaging said traveler and said storage unit;
   displacing said storage unit from said traveler including a horizontal displacement and a vertical displacement by said telescoping actuator;
   deactivating said telescoping actuator upon positioning said storage unit adjacent the surface;
   activating said telescoping actuator engaging said traveler and said storage unit;
   displacing said storage unit including a horizontal displacement and a vertical displacement from adjacent the surface by said telescoping actuator;
   deactivating said telescoping actuator upon said storage unit positioned adjacent to said traveler;
   activating said linear actuator engaging said base and said traveler;
   displacing said traveler from said distal end and to said proximal end of said lower track and said upper track by said linear actuator;
   displacing a storage unit from said cantilever position above the surface and beyond said distal end of a lower track and an upper track and to said proximal end by coupling with said traveler; and
   deactivating said linear actuator upon said traveler positioned at said proximal end of said lower track and said upper track.

20. A cargo handling device for a vehicle, the vehicle having a cargo surface, the vehicle transporting a cargo over a surface, the cargo handling device, comprising:
   a base extending between a lower end and an upper end;
   said lower end of said base coupled to the cargo surface;
   a lower track extending between a proximal end and a distal end;
   said proximal end of said lower track coupled to said base;
   a traveler having a lower track receiver;
   said lower track receiver of said traveler slidably engaging said lower track between said proximal end and said distal end of said lower track;
   a storage unit having a lower track receiver and extending between a proximal end and a distal end;
   said lower track receiver of said storage unit slidably engaging said lower track between said proximal end and said distal end of said lower track;
   a linear actuator engaging said base and said traveler for displacing said traveler along said lower track between said proximal end and said distal end of said lower track;
   a telescoping actuator defining a contracted length and an extended length;
   an upper actuator pivot pivotably coupling said telescoping actuator to said traveler;
   a lower actuator pivot pivotably coupling said telescoping actuator to said storage unit;
   said contracted length in said telescoping actuator maintaining said traveler abutting said proximal end of said storage unit during displacement of said traveler between said proximal end and said distal end of said lower track;
   said extended length in said telescoping actuator displacing said storage unit from said traveler upon said traveler positioned at said distal end of said lower track;
   said extended length defining a horizontal displacement and a vertical displacement of said storage unit from said traveler for positioning said storage unit adjacent the surface; and
   a cargo receiver coupled to said storage unit for engaging the cargo.

* * * * *